(12) United States Patent
Teller

(10) Patent No.: US 7,202,780 B2
(45) Date of Patent: Apr. 10, 2007

(54) SERVICE TRANSACTION MONITORING SYSTEM, METHOD AND DEVICE

(75) Inventor: David M. Teller, Novato, CA (US)

(73) Assignee: Beverage Metrics Holding Ltd., Baar (CH)

( * ) Notice: Subject to any disclaimer, the term of this patent is extended or adjusted under 35 U.S.C. 154(b) by 174 days.

(21) Appl. No.: 10/990,543

(22) Filed: Nov. 18, 2004

(65) Prior Publication Data

US 2005/0237213 A1    Oct. 27, 2005

Related U.S. Application Data

(60) Division of application No. 10/243,545, filed on Sep. 16, 2002, which is a continuation of application No. 09/733,719, filed on Dec. 8, 2000, now Pat. No. 6,504,481.

(60) Provisional application No. 60/169,918, filed on Dec. 10, 1999.

(51) Int. Cl.
*G08B 1/08* (2006.01)

(52) U.S. Cl. ............ 340/539.31; 340/516; 340/539.23; 222/23; 222/36

(58) Field of Classification Search ........... 340/539.31, 340/539.1, 539.23, 516; 222/1, 23, 36; 211/59.2, 49.1
See application file for complete search history.

(56) References Cited

U.S. PATENT DOCUMENTS

| | | | |
|---|---|---|---|
| 3,170,597 A * | 2/1965 | Reichenberger | 222/36 |
| 3,920,149 A * | 11/1975 | Fortino et al. | 222/1 |
| 4,158,624 A | 6/1979 | Ford et al. | |
| 4,168,410 A | 9/1979 | Norris | |
| 4,278,186 A | 7/1981 | Williamson | |
| 4,409,649 A | 10/1983 | Heeger | |
| 4,419,016 A | 12/1983 | Zoltan | |
| 4,433,795 A | 2/1984 | Maiefski et al. | |
| 4,494,656 A | 1/1985 | Shay et al. | |
| 4,660,742 A | 4/1987 | Ozedemir | |
| 4,695,954 A | 9/1987 | Rose et al. | |
| 4,884,212 A | 11/1989 | Stutsman | |
| 4,944,337 A | 7/1990 | Credle, Jr. et al. | |
| 4,961,533 A | 10/1990 | Teller et al. | |
| 4,978,946 A | 12/1990 | Nordholm et al. | |
| 5,042,686 A | 8/1991 | Stucki | |

(Continued)

FOREIGN PATENT DOCUMENTS

WO    WO 81/01506    6/1981

(Continued)

*Primary Examiner*—Daniel Wu
*Assistant Examiner*—Daniel Previl
(74) *Attorney, Agent, or Firm*—Jagtiani + Guttag

(57) ABSTRACT

A system, method, and device for monitoring the dispensing of liquids, in particular, beverages dispensed at a bar or restaurant is disclosed. The device attaches to the exterior of a container and detects dispensing events by sensing tilt or motion of the container, which could include a bottle or a handle. The system includes an electronic sensor device, data receiver, personal computer, bottle opener/camera system, bar code scanner, point of sale, bar camera, network, Web server, and paging system. The method automatically detects and monitors dispensing events, including detecting the type and amount of liquid, reconciling dispensing events with register ring-ups recording information, saving video specific to the dispensing event, and sending a page indicating anomalies.

9 Claims, 26 Drawing Sheets

U.S. PATENT DOCUMENTS

| | | |
|---|---|---|
| 5,044,521 A | 9/1991 | Peckels |
| 5,091,713 A | 2/1992 | Horne et al. |
| 5,115,888 A | 5/1992 | Schneider |
| 5,158,793 A | 10/1992 | Helbing |
| 5,255,819 A * | 10/1993 | Peckels ............ 222/1 |
| 5,318,197 A | 6/1994 | Martindale et al. |
| 5,350,082 A | 9/1994 | Kiriakides, Jr. et al. |
| 5,372,054 A * | 12/1994 | Federighi, Sr. ............ 81/3.09 |
| 5,379,916 A | 1/1995 | Martindale et al. |
| 5,505,349 A | 4/1996 | Peckels |
| 5,557,529 A | 9/1996 | Warn et al. |
| 5,566,732 A | 10/1996 | Nelson |
| 5,603,430 A | 2/1997 | Loehrke et al. |
| 5,663,887 A | 9/1997 | Warn et al. |
| 5,722,526 A | 3/1998 | Sharrard |
| 5,767,775 A | 6/1998 | Shukla et al. |
| 5,826,409 A * | 10/1998 | Slepicka et al. ............ 53/492 |
| 5,831,861 A | 11/1998 | Warn et al. |
| 5,854,994 A | 12/1998 | Canada et al. |
| 5,884,292 A | 3/1999 | Baker et al. |
| 5,889,676 A | 3/1999 | Kubo et al. |
| 5,930,146 A | 7/1999 | Takenaka |
| 5,930,766 A | 7/1999 | Gibb |
| 5,969,606 A | 10/1999 | Reber et al. |
| 6,036,055 A * | 3/2000 | Mogadam et al. ............ 222/23 |
| 6,053,359 A | 4/2000 | Goulet et al. |
| 6,056,108 A | 5/2000 | Buchi et al. |
| 6,056,194 A | 5/2000 | Kolls |
| 6,101,452 A | 8/2000 | Krall et al. |
| 6,150,942 A | 11/2000 | O'Brien |
| 6,321,620 B1 * | 11/2001 | Fabbro ............ 81/3.2 |
| 6,564,121 B1 | 5/2003 | Wallace et al. |
| 6,606,605 B1 | 8/2003 | Kolls |
| 6,854,642 B2 | 2/2005 | Metcalf et al. |
| 2002/0087413 A1 | 7/2002 | Mahaffy |
| 2002/0107610 A1 | 8/2002 | Kaehler et al. |
| 2003/0055589 A1 | 3/2003 | Mogedam et al. |
| 2003/0057226 A1 | 3/2003 | Long |

FOREIGN PATENT DOCUMENTS

| | | |
|---|---|---|
| WO | WO 96/36950 | 11/1996 |

* cited by examiner

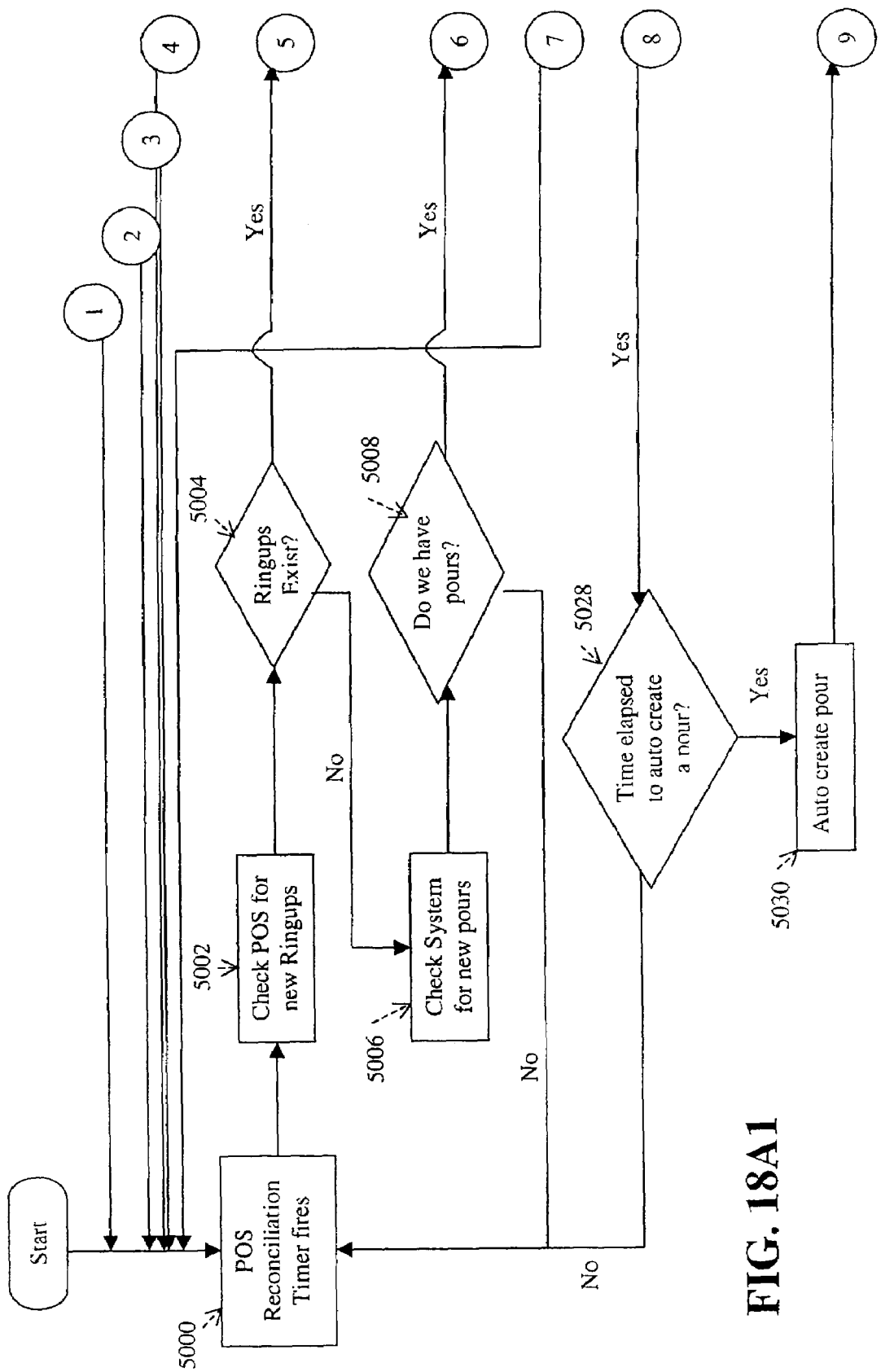
FIG. 18A1

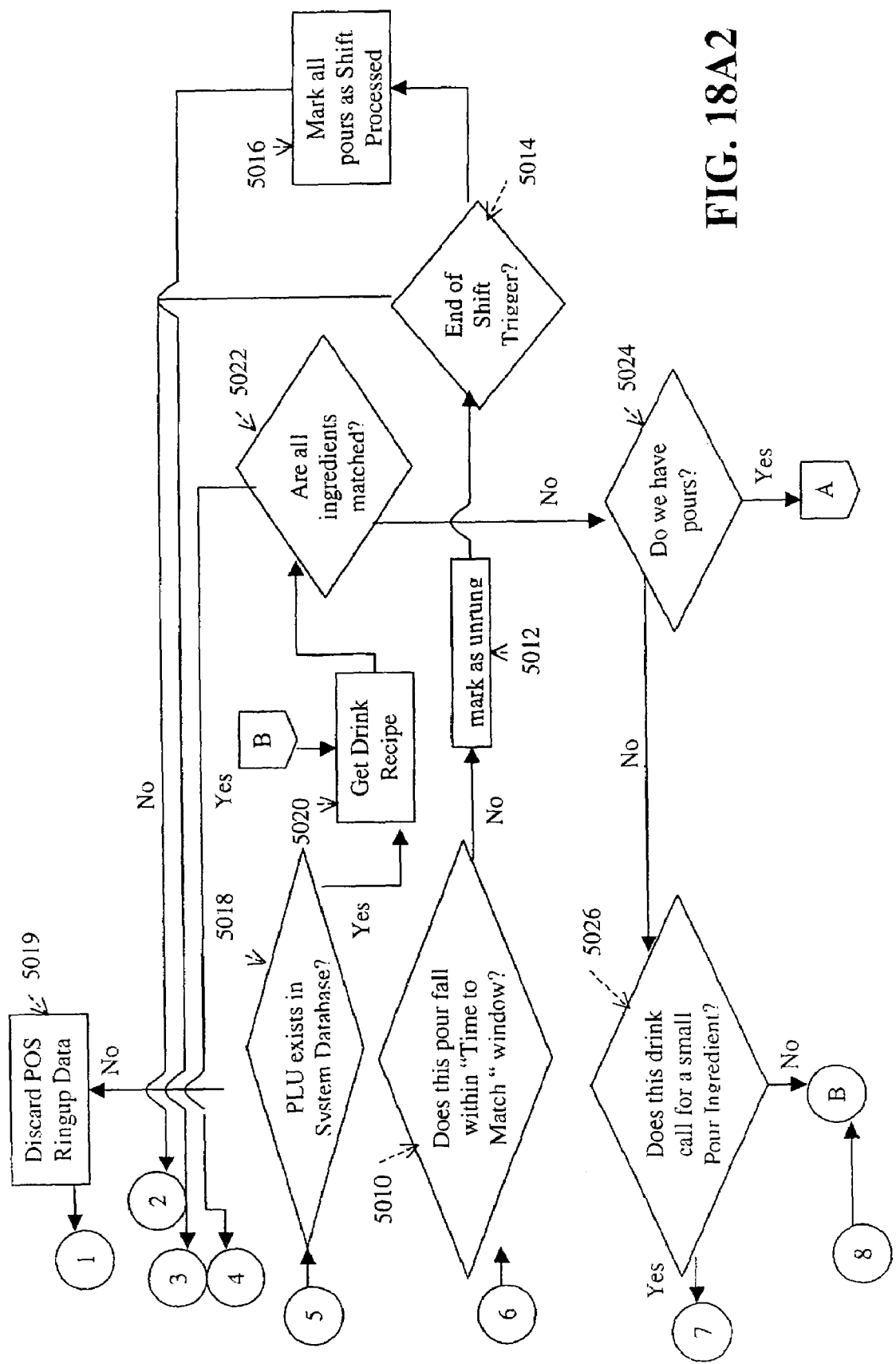
FIG. 18A2

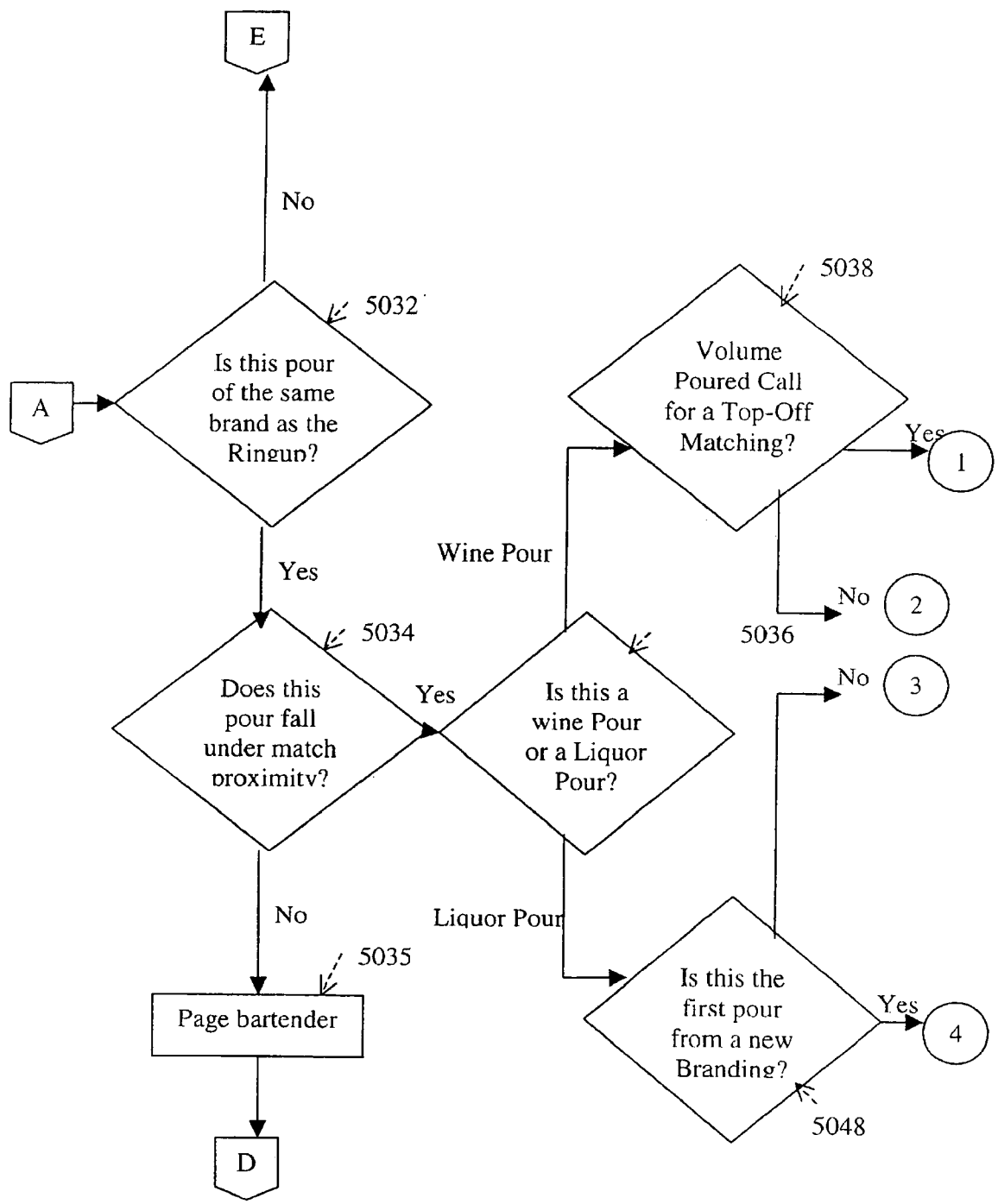
FIG. 18B1

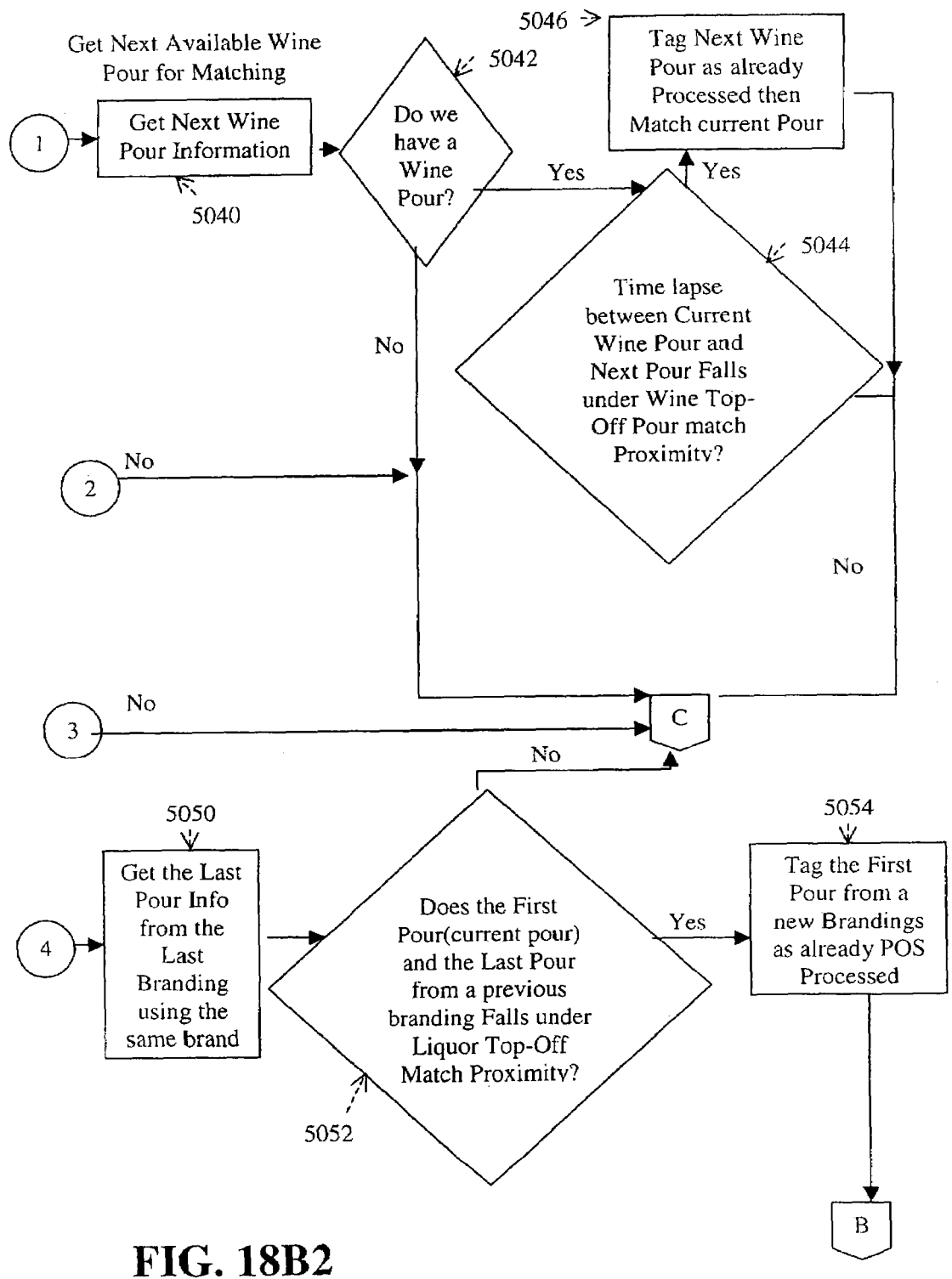
FIG. 18B2

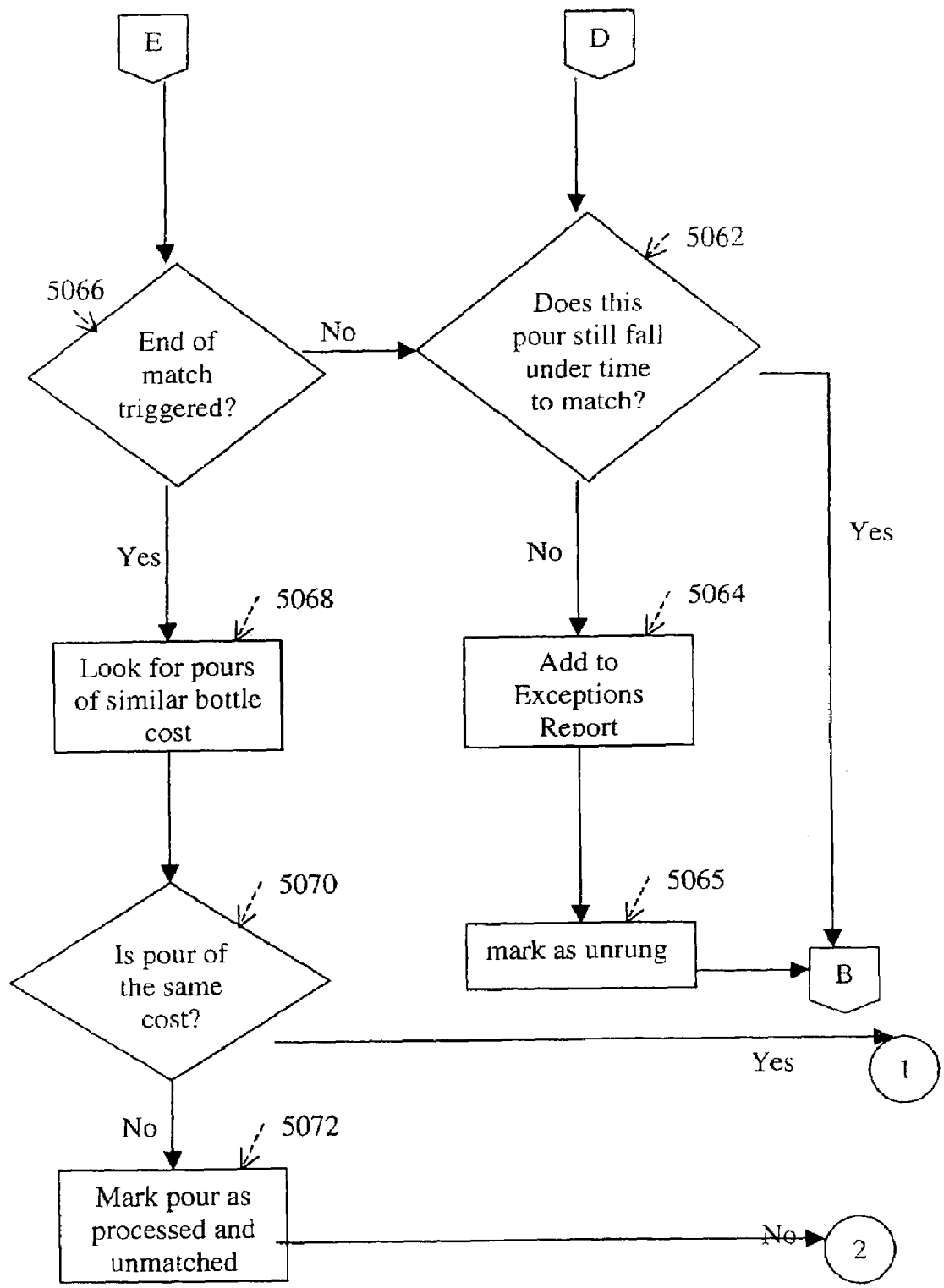
FIG. 18C1

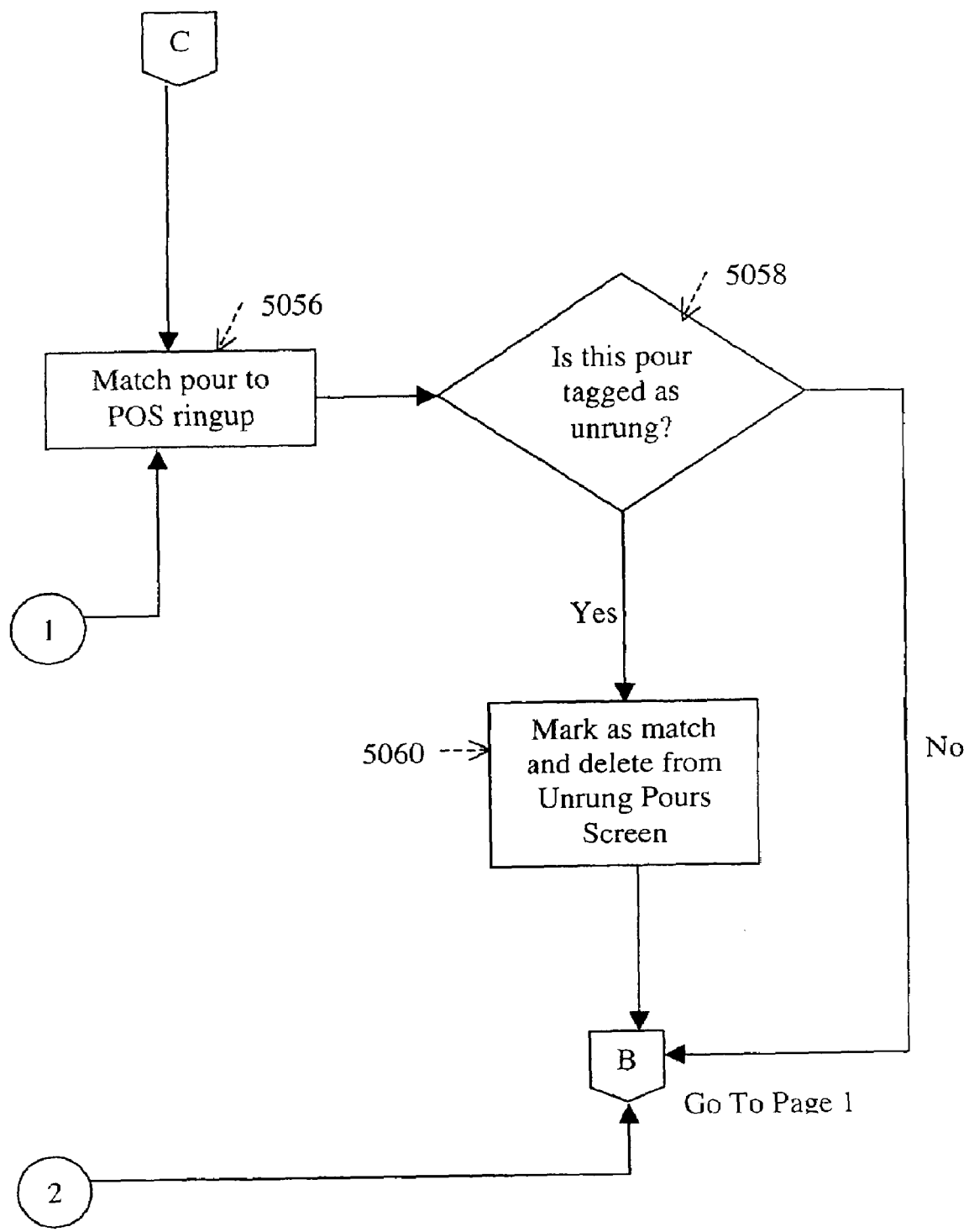
FIG. 18C2

SERVICE TRANSACTION MONITORING SYSTEM, METHOD AND DEVICE

CROSS REFERENCE TO RELATED APPLICATIONS AND CLAIM OF PRIORITY

This application is a divisional application of U.S. application Ser. No. 10/243,545, entitled, "Service Transaction Monitoring System, Method and Device," filed on Sep. 16, 2002, which is a continuation of U.S. application Ser. No. 09/733,719, entitled "Service Transaction Monitoring System, Method and Device," filed on Dec. 8, 2000, now U.S. Pat. No. 6,504,481, issued on Jan. 7, 2003, which claims the benefit of U.S . Provisional Patent Application No. 60/169,918, entitled "Service Transaction Monitoring System," filed on Dec. 10, 1999. The entire disclosure and contents of the above patents and applications are hereby incorporated by reference.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND OF THE INVENTION

1. Field of Invention

This invention relates generally to the field of system, methods, and electronic devices used to monitor the dispensing of liquids, in particular, beverages dispensed at a bar or restaurant.

2. Description of the Related Art

Bars and restaurants lose a significant amount of revenue due to pilferage at the point of sale, pilferage of bottles from the bar and storage areas and dispensing of drinks to "buddies," as well as due to manual, delayed, and error-prone methods of establishing and keeping metrics. Critical metrics such as pouring cost, pour accuracy and inventory values are calculated as infrequently as once a month, manually on "inventory" day. The task of counting and measuring beverage inventory and calculating pouring costs is time consuming and open to intentional and unintentional errors.

Technical solutions exist that address some of the described problems for some of the beverages. For instance, multiple serving bottles can be fitted with a control or counting device in the neck of the bottle, or drinks can be dispensed through a gun or other electro/mechanical device. Other solutions include measuring the amount poured prior to serving, or weighing bottles after each serving or at the end of a shift or week. These solutions are typically used in airports and casinos where customer satisfaction takes second place to controls.

Existing methods have a negative impact on customers and on the bar aesthetic, and are therefore rejected by the vast majority of owners. Thus, most casual and fine dining establishments choose to suffer pilferage and inefficiencies that are endemic to the industry, rather than aggravate their customers with controlled or measured pours and devices that disturb the ambiance and aesthetic of the point of sale.

There is a need for a service transaction and monitoring system that can efficiently record beverage sales and payment activity without directly controlling or measuring the drink served and without impacting the aesthetic of the bar. There is also a need for a system that automatically calculates pouring costs, pour accuracy, and inventory values at the end of each shift so that there is immediate, accurate accountability and continuous metrics for management. There is a need for a system that alerts employees to anomalies almost immediately so that they can be corrected on the spot. There is also a need to be able to audit sales activity on a per event basis so that management has an efficient and reliable method to arbitrate disputes. Finally, there is a need to have a common user interface and common reports for all the disparate disciplines needed to monitor and manage the beverage inventory and sales business regardless of the type of container from which the beverages are dispensed.

The present invention fulfills these needs.

SUMMARY OF THE INVENTION

The present invention provides a system, method, and device for monitoring service transactions, in particular, the dispensing of liquids. The system includes an electronic sensor device, data receiver, and personal computer. The system may also include a bottle opener/camera system, bar code scanner, point of sale system, bar camera, network, Web server, and paging system.

The invention provides a method for automatically detecting dispensing events including the steps of detecting an event of dispensing a liquid and detecting the type and amount of the liquid dispensed.

The invention also provides a method for automatically monitoring dispensing events including the steps of detecting an event of dispensing a liquid, determining the type and amount of liquid dispensed, and reconciling the dispensing event with a register ring-up.

The method may also include the steps of recording information about dispensing events and transmitting dispensing event information. The method may include the steps of determining the identity of the person who dispensed the dispensing event. The method may also include the step of saving video corresponding to the dispensing event. The method may also include the step of sending an electronic page on the occurrence of a particular event, such as when a drink has not been rung up within a specified period of time, or when an electronic sensor device is removed from a container.

The invention also provides an electronic sensor device which detects the dispensing of a liquid from a container. The sensor device is attached to the exterior of the container and does not contact the liquid or affect the flow of liquid from the container. The electronic sensor device transmits information about the dispensing event to a data receiver. The electronic sensor device may be attached to bottles, tap handles, or other multiple serving containers.

BRIEF DESCRIPTION OF THE DRAWINGS

FIGS. 18A, 18B, and 18C are a flow chart showing the sub-steps of point of sale matching.

DETAILED DESCRIPTION OF PREFERRED EMBODIMENTS OF THE INVENTION

Components of Service Transaction Monitoring System

Figure 1:
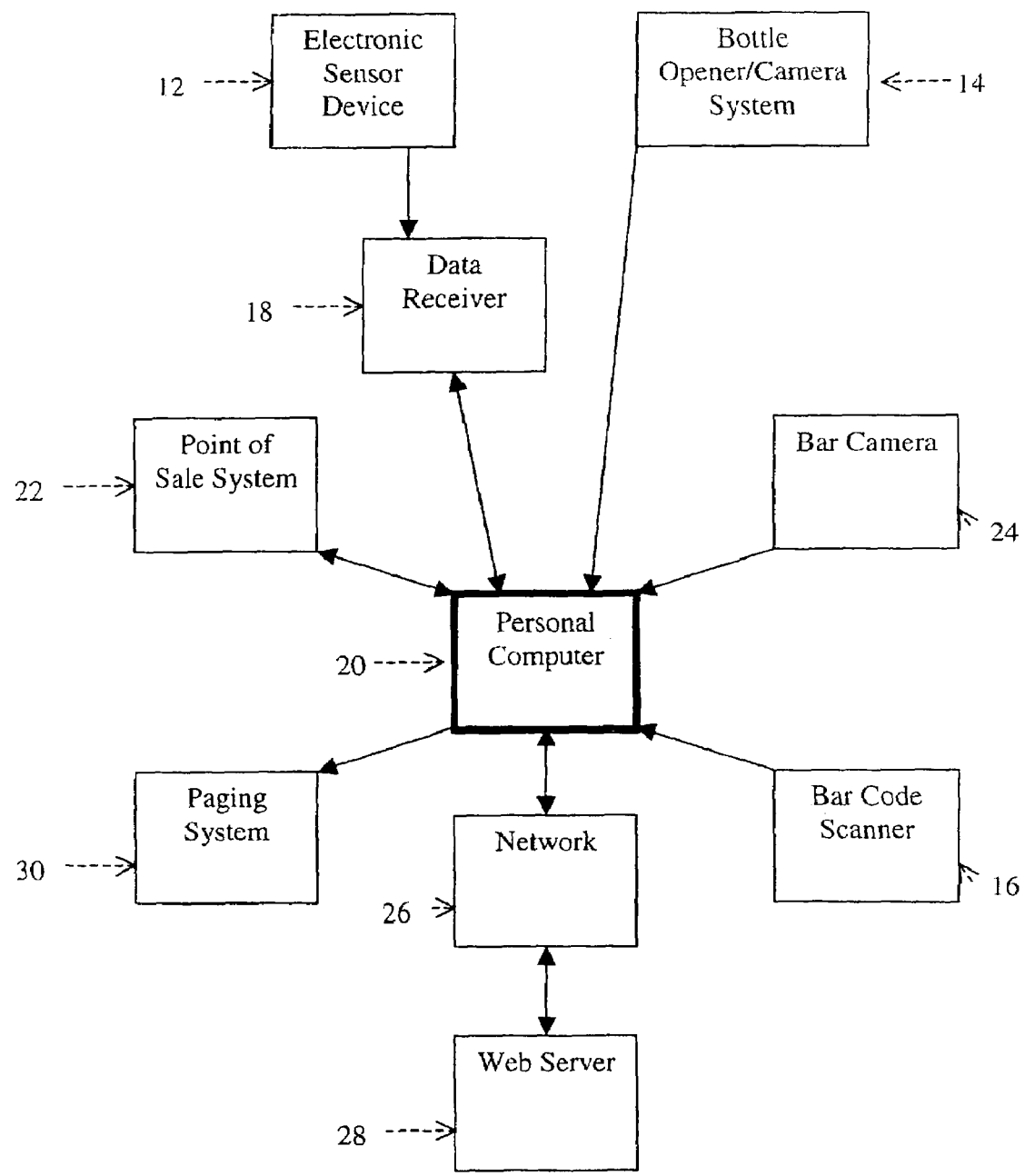
FIG. 1 is a block diagram showing the components of the preferred embodiment of the system.

FIG. 1 is a block diagram that shows the components of service transaction monitoring system 10. System 10 preferably includes electronic sensor device 12, bottle opener/camera system 14, bar code scanner 16, data receiver 18, personal computer 20, point of sale (POS) system 22, bar camera 24, network 26, Web server 28, and paging system 30. Although a system 10 including these components is preferable, a system 10 which includes sensor device 12, data receiver 18, and personal computer 20 would work as a detection system.

Electronic sensor device 12 and bottle opener/camera system 14 detect the dispensing of beverages and record information about dispensing events. Sensor device 12 detects the dispensing of beverages from multiple-serving containers, such as bottles of wine, liquor, and drink mixes, including the free pouring of such drinks, and dispensing from kegs, and other types of containers. Free pouring of drinks generally means pouring a drink from a multiple-serving bottle without measuring, controlling, or affecting the drink size through devices such as guns, nozzles, pourers, or measuring glasses. Bottle opener/camera system 14 detects the dispensing of beverages from single-serving containers, such as bottles of beer and soft drinks. Bar camera 24 records information about dispensing events and other related events.

Dispensing event information from sensor device 12 is transmitted wirelessly to data receiver 18 and then to personal computer 20. Dispensing event information from bottle opener/camera system 14 may be transmitted to data receiver or directly to personal computer 20. Bar camera 24 transmits information to personal computer 20. Point of sale system 22 records payment and other information for the beverages dispensed, transmits the information to personal computer 20, and communicates with personal computer 20. Personal computer 20 contains databases, which include dispensing event and payment information, as well as recipes for drinks, the identifiers and status of sensor devices 12, images of bottle cap labels, inventor, and personnel information. Personal computer 20 also contains applications software, through which it processes the dispensing event information and the payment information. Processing includes the reconciliation of dispensing events and register ring-ups, as well as the tracking or accounting of dispensing events which cannot be reconciled. Personal computer 20 may communicate information to management persons or others through paging system 30. Personal computer 20 may communicate with Web server 28 over network 26.

Electronic Sensor Device

Electronic sensor device 12 is an electronic device that attaches to a container, such as a bottle, or a dispensing mechanism of a container, such as a tap handle. Sensor device 12 may also be attached to a door, such as a door to a cooler, refrigerator, or wine cellar. Each sensor device 12 has a unique identifier, which may be a number code. Sensor device 12 utilizes a sensor to automatically detect a change in position or to detect movement, such as a dispensing event or a door opening, and to record information about the event. The sensor may be a tilt switch that detects changes in the angle of a container, such as a mercury tilt switch, or a small motion detection device, such as a single chip accelerometer, that detects movement of a container, tap handle or other type of handle, or door. Analog Devices, Inc. of Norwood, Mass., offers integrated micro-electrical-mechanical systems (IMEMS) that work well. Other types of sensors may also work well.

First Embodiment of Sensor Device

Figure 2:
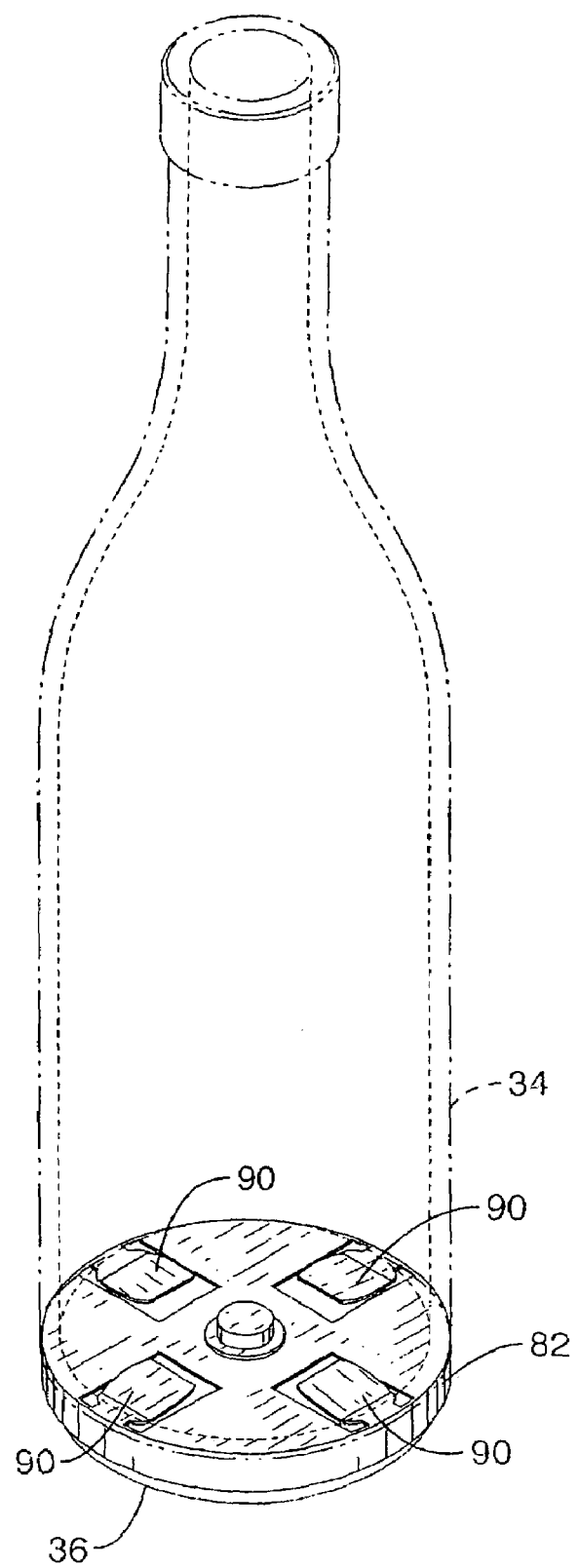
FIG. 2 is a top perspective view of the first embodiment of the sensor device and holder.
Figure 3A:
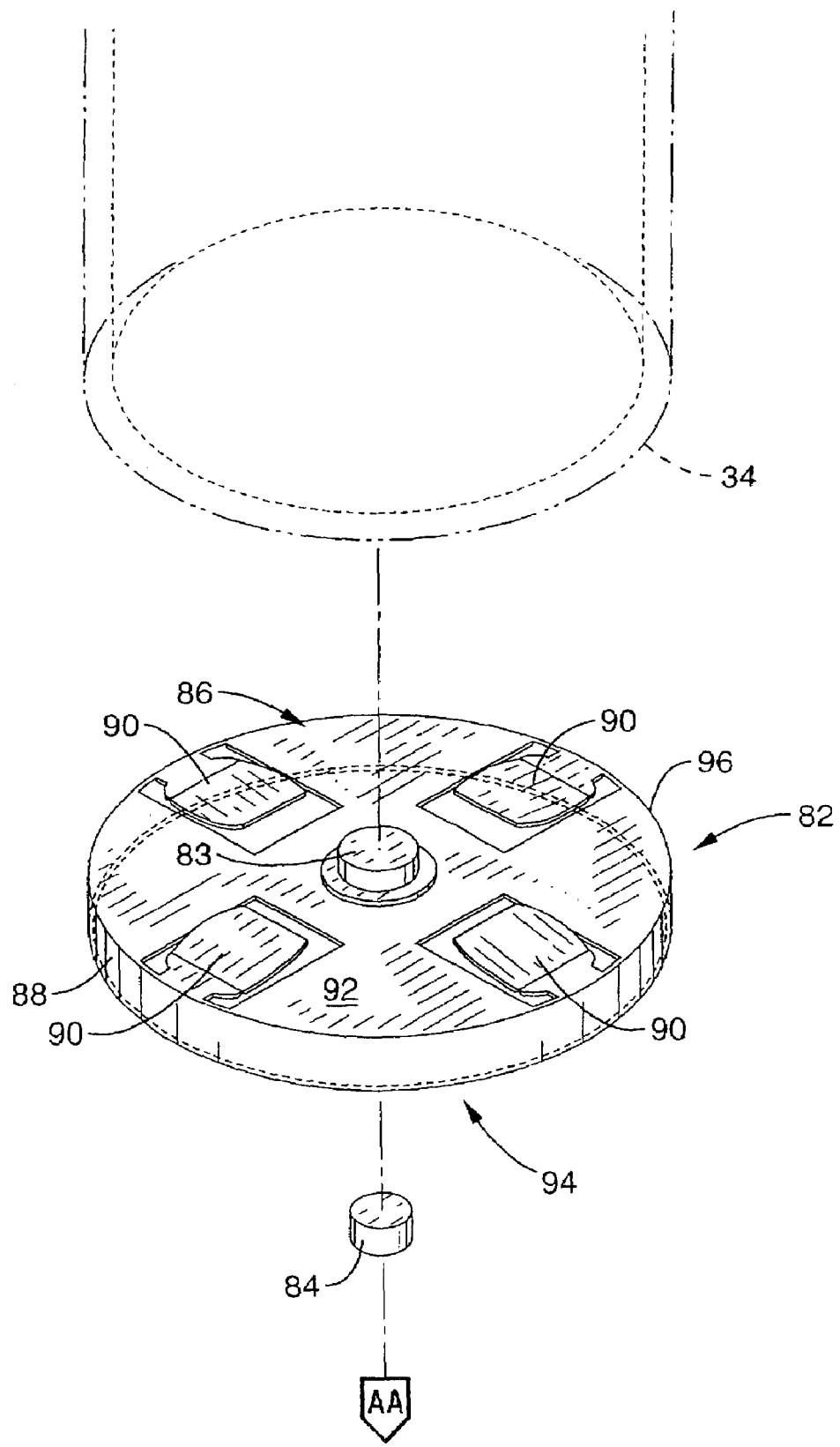
FIGS. 3A and 3B are an exploded view of the first embodiment of the sensor device and holder.
Figure 3B:
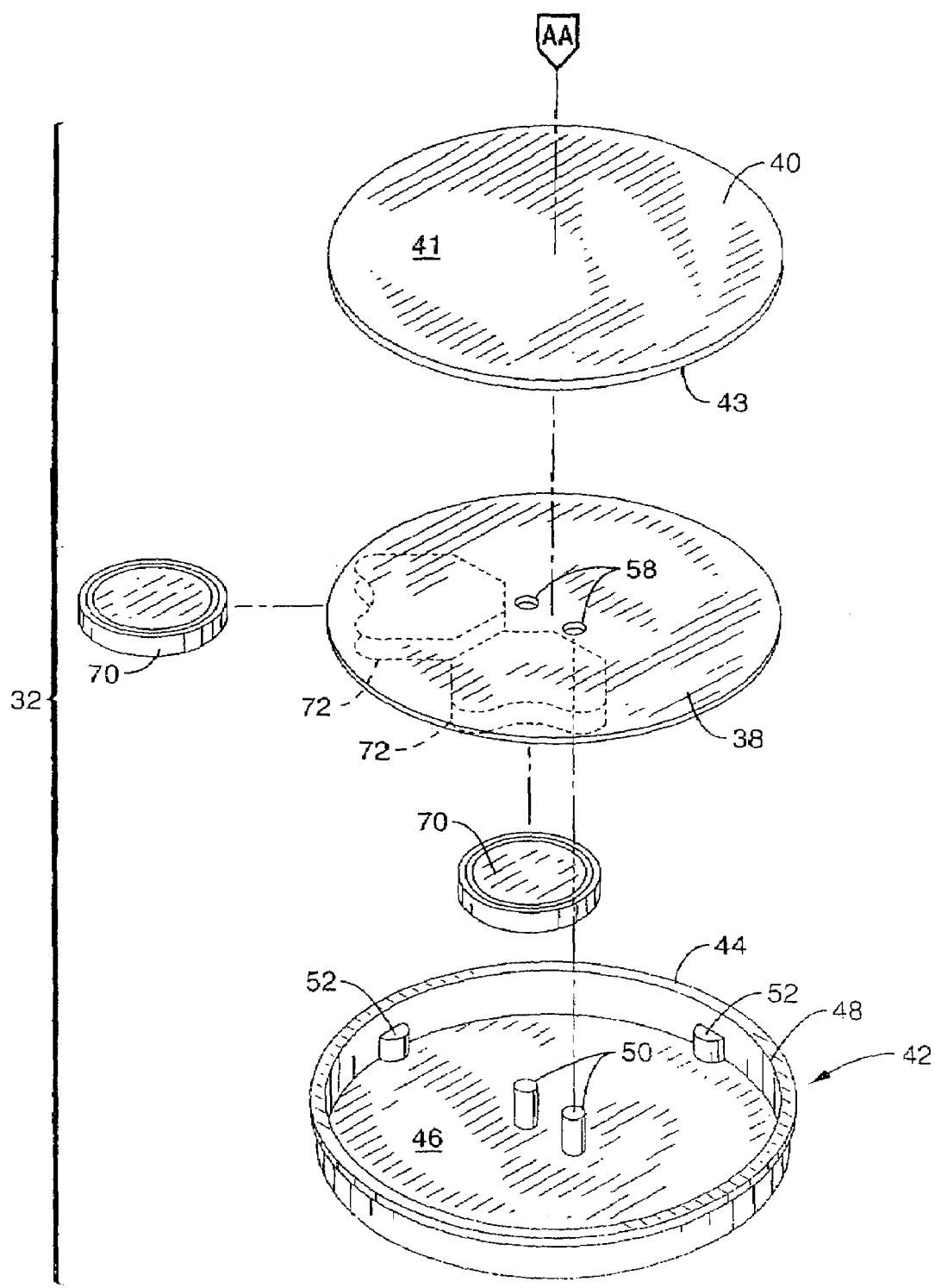

FIGS. 2, 3A and 3B show first embodiment 32 of sensor device 12 as used with bottle 34. Sensor device 32 is disc-shaped and is about 2⅝ inches in diameter and about ⅜ inch thick. Sensor device 32 includes housing 36, printed circuit board 38, and electronic components. Housing 36 has planar lid portion 40 and cup portion 42. Lid portion 40 is about 2⅜ inches in diameter and about 1/16 inch thick. Lid portion 40 has upper surface 41 and lower surface 43. Cup portion 42 is about 2⅝ inches in diameter and ⅜ inch thick. Cup portion 42 has a surrounding circular wall 45, upper rim 44, a planar bottom 47, inside bottom surface 46, inner ledge 48 running about the inside circumference 49 of circular wall 45, posts 50, and projections 52. Wall 45 has an interior and exterior surface. Interior surface of wall 45 and inside bottom surface 46 form a cavity to receive electronic circuit 39. Inner ledge 48 is located about 1/16 inch below upper rim 44, such that when lid portion 40 is placed on top of and inside cup portion 42, lower surface 43 of lid portion 40 rests on inner ledge 48. Two posts 50 project upward from inside bottom surface 46. Posts 50 are located approximately in the center of cup portion 42 and are approximately ⅛ inch tall. Four projections 52 are located on inside circumference 49 below inner ledge 48.

Lid portion 40 and cup portion 42 are preferably made of rigid molded plastic, such as a polycarbonate or "ABS." These materials ensure that sensor device 32 can withstand the high temperatures and moisture common in a bar or restaurant, such as from steam cleaning, and can withstand physical shock. Lid portion 40 and cup portion 42 are non-removable attached to each other in a waterproof fashion to form housing 36. Preferable methods of attaching include sonic welding, epoxy sealant, or potting material.

Printed circuit board 38 is located inside housing 36 and has upper surface 54 and lower surface 56. Printed circuit board 38 rests inside housing 36, having its lower surface 56 contacting projections 52 and its upper surface 54 against lid portion 40. Printed circuit board is circular and approximately two inches in diameter; however, circuit boards of other shapes and sizes would also work as long as they fit inside housing 36, which need only be large enough to contain the electronic components discussed below. Printed circuit board 38 has two apertures 58 located approximately in the center of printed circuit board 38. When printed circuit board 38 is placed inside cup portion 42, its lower surface 56 contacts projections 52, and posts 50 fit into apertures 58, elevating circuit board 38 approximately ⅛ inch above inside bottom surface 46. Posts 50 contact lower surface 43 of lid portion 40, such that lid portion 40 does not crush printed circuit board 38.

Several electronic components are soldered to printed circuit board 38 and form an electronic circuit 39. They include microcontroller 60, radio transmitter 62, radio antenna 64, magnetic sensing or Hall effect switch 66, mercury tilt switch 68, battery 70, battery holder 72, pull-up resistors 73 and 74, bypass capacitors 75, 76, and 77, and oscillator 78. The following brands have been found to work satisfactorily: microcontroller 60, part no. PIC12LC672-04/SM made by Microchip; radio transmitter 62, part no. TXM-418-LC by Linx Technologies; radio antenna 64, part no. ANT-418-SP made by Linx Technologies; magnetic sensing switch 66, part no. A3209ELH made by Allegro Microsystems; mercury tilt switch 68, part no. CM1350-0 made by Comus International; battery holder 72, part no. 3002 made by Keystone; resistors 73 and 74, part no. ERJ-8GEYJ224V made by Panasonic; capacitors 75, 76, and 77, part no. 12062R104K9B20D made by Phillips; and oscillator 78, part no. EFO-S4004E5 made by Panasonic.

Each microcontroller 60 has a unique identifier, which may include numbers or letters.

Battery 70 is a non-replaceable, three-volt battery, and is preferably a lithium coin cell. Each battery 70 is removably contained within its own battery holder 72. Sensor device 32 preferably contains two batteries 70 and two corresponding battery holders 72 placed in parallel on circuit board 38. Battery holders 72 and their associated output leads provide a means for applying a potential to electronic circuit 39.

Oscillator 78 is preferably a four megahertz crystal.

Other types of components may perform the desired functions satisfactorily. For example, in lieu of radio transmitter 62, an infrared or other type of wireless transmitter could be used, and, in lieu of magnetic sensing switch 66, a mechanical switch could be used.

Figure 4A:
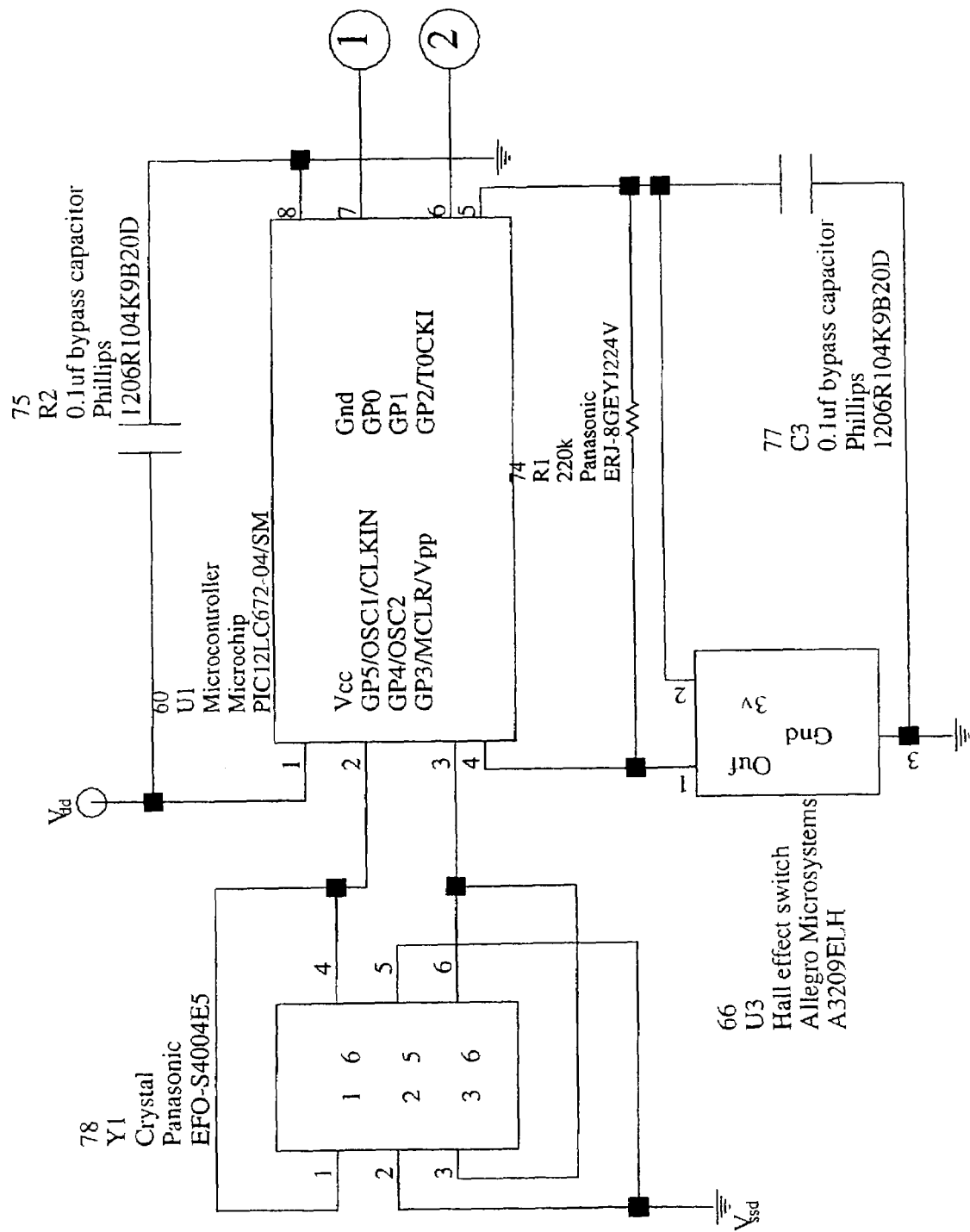
FIG. 4 is a schematic drawing of the electronic circuit of the sensor device.
Figure 4B:
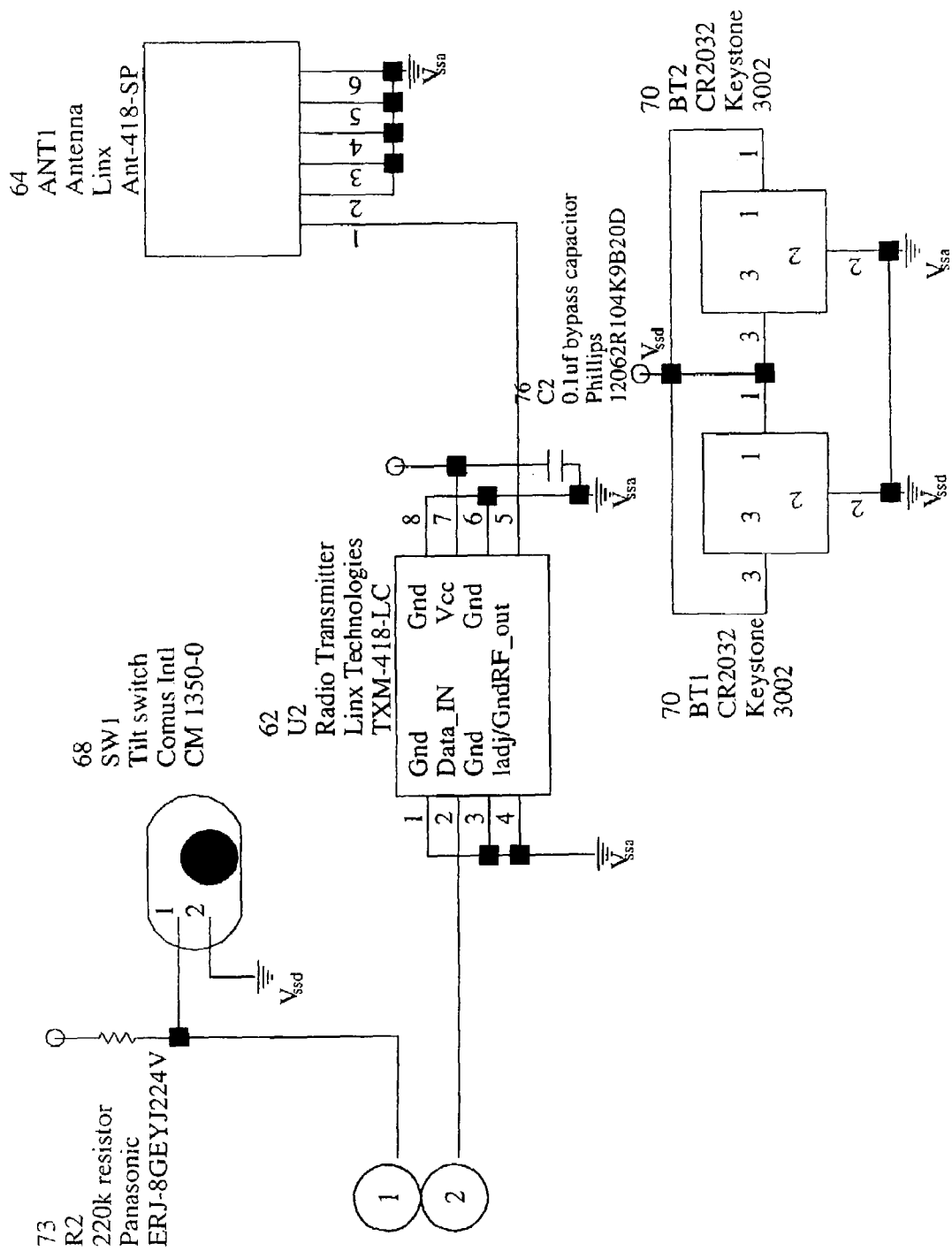

FIG. 4 is a schematic drawing of electronic circuit 39 of sensor device 32. Lithium coin cells 70 provide unregulated three volt directly to all components of circuit battery 70 terminals. Crystal or resonator 78 for microcontroller 60's clock oscillator is preferably set at a frequency of four megahertz and is connected to microcontroller 60's oscillator inputs. Bypass capacitor 75 is connected between microcontroller 60's power and ground to provide current reserves, preferably of 0.1 uF value. Magnetic sensing or Hall effect switch 66 has output that changes state in the presence of a magnetic field. Magnetic sensing switch 66's output is fed to an input on microcontroller 60. Power for magnetic sensing switch 66 is provided by an output from microcontroller 60, allowing it to be turned off when not needed to extend the life of battery 70. Bypass capacitor 77, preferably of 0.1 uF value, is connected between magnetic sensing switch 66's power and ground pins. Resistor 74 is a high-value pull-up resistor connected between magnetic sensing switch 66's output and power pins as magnetic sensing switch 66's output is open-collector. Mercury tilt switch 68 is connected to an input on microncontroller 60. Pull-up resistor 73, which along with mercury tilt switch 68, provides a digital input to microcontroller 60 indicating the state of mercury tilt switch 68. Radio transmitter 62's input is connected to an output from microcontroller 60. Bypass capacitor 76, preferably of 0/1 uF value, is connected between radio transmitter 62's power and ground pins. Antenna 64 is an antenna for radio transmitter 62 and is connected to radio transmitter 62's output.

Figure 5A:
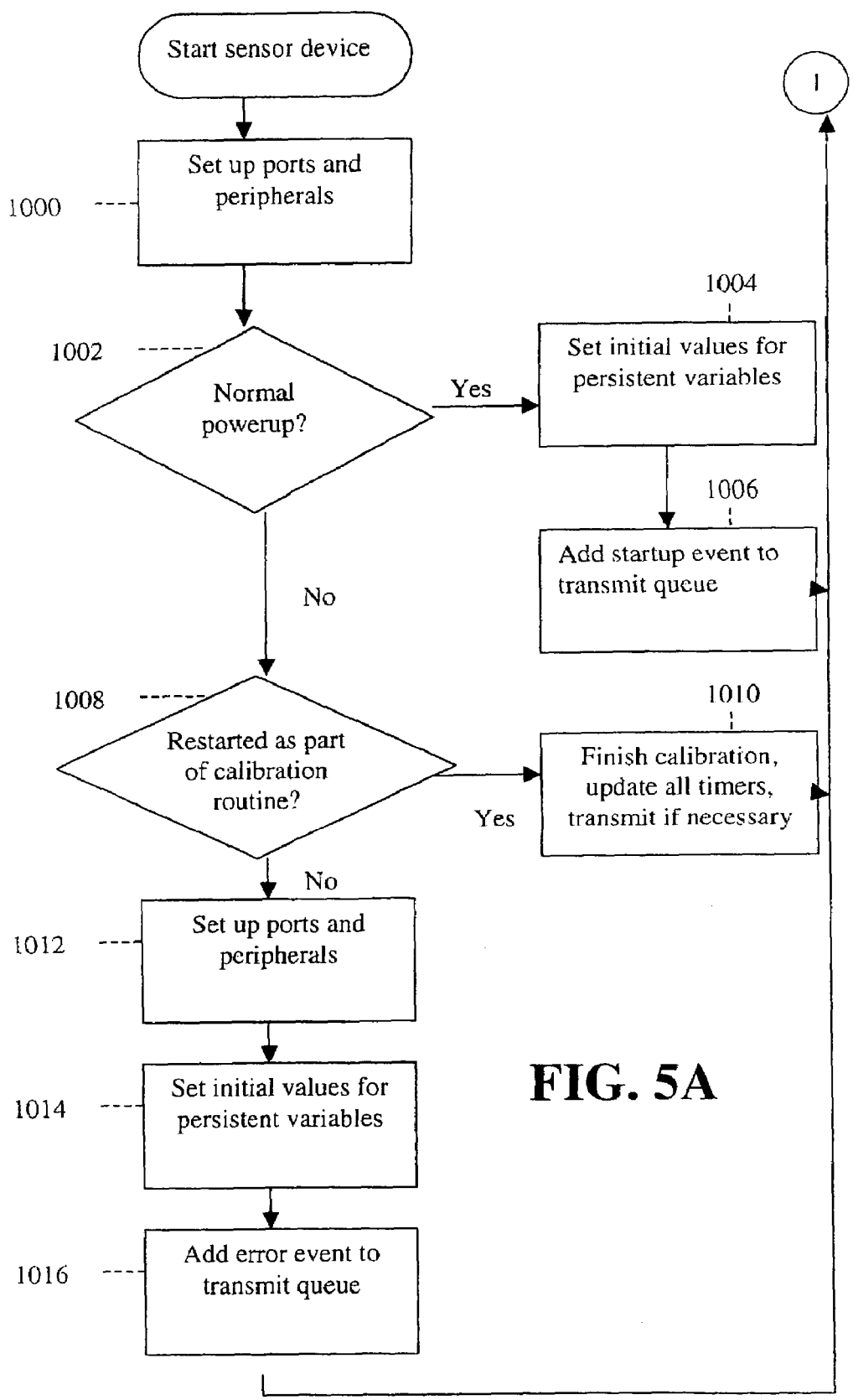
FIG. 5 is a flow chart of the steps executed by the microcontroller of the sensor device.
Figure 5B:
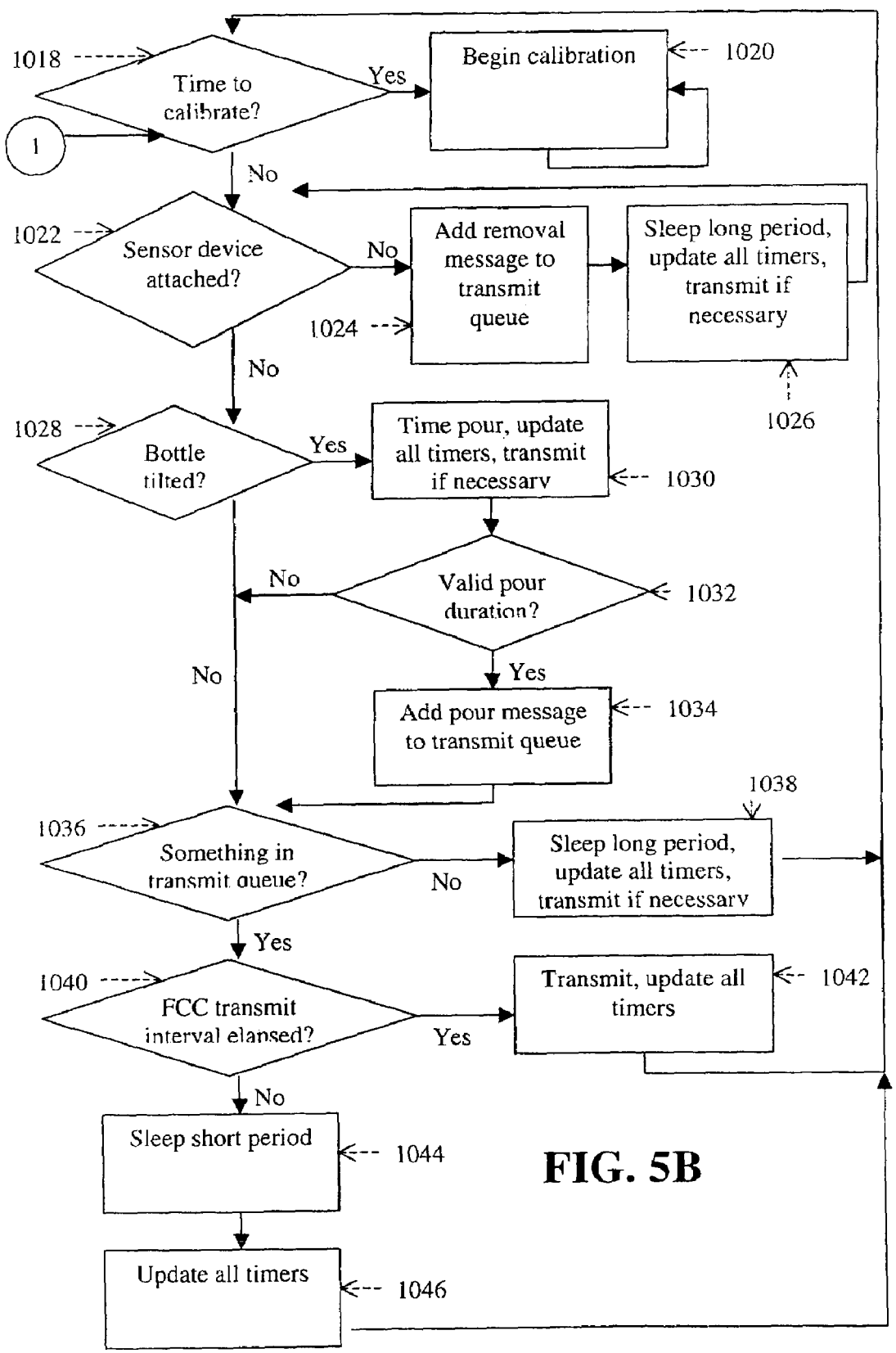
Figure 6:
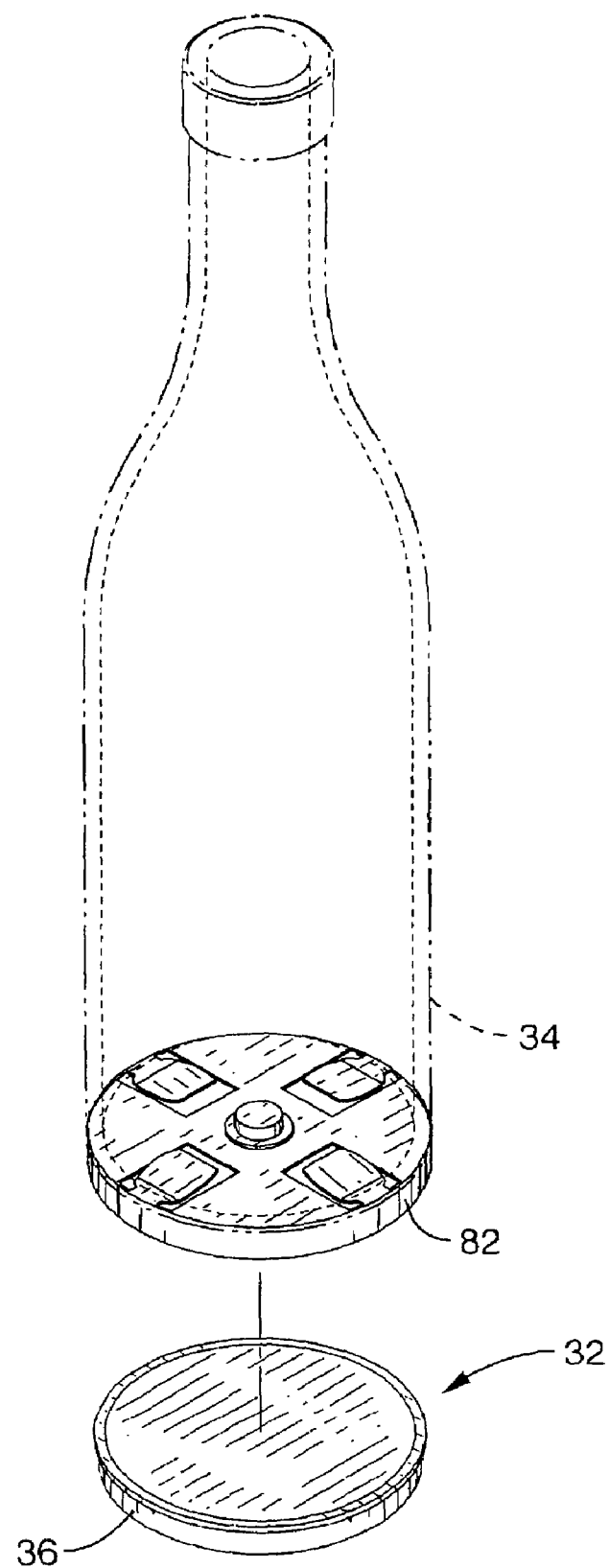
FIG. 6 is an exploded view of the first embodiment of the sensor device and holder.
Figure 7:
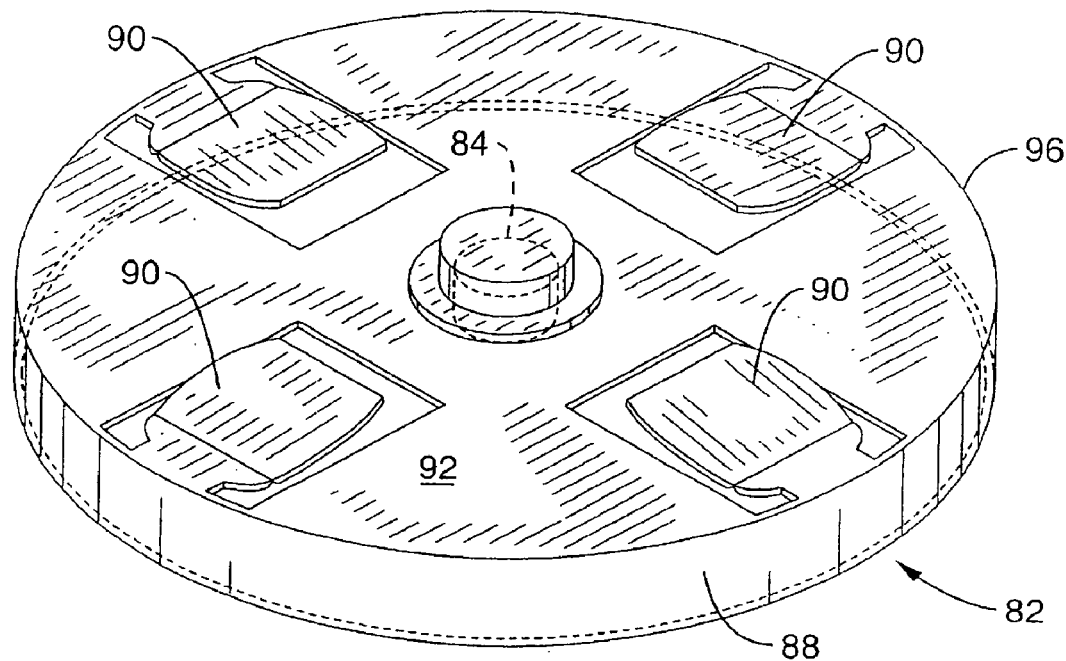
FIG. 7 is a perspective view of the holder for the first embodiment of the sensor device.
Figure 8:
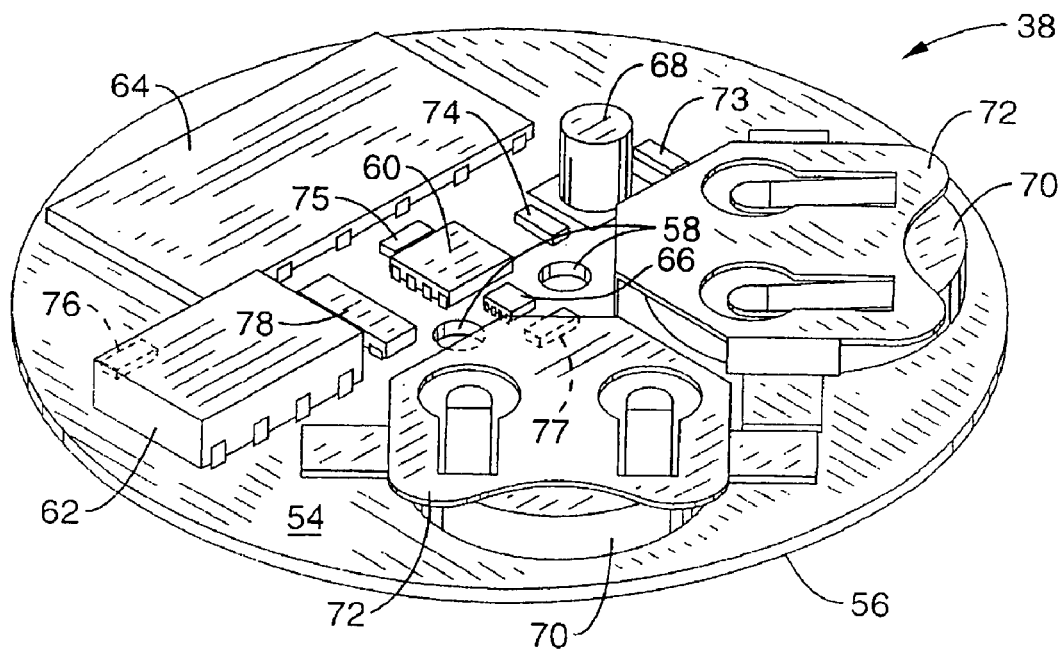
FIG. 8 is a perspective view of the circuit board of the first embodiment of the sensor device.

Microcontroller 60 is programmed to execute the steps shown in FIG. 5. In step 1000, port registers and any internal peripherals are initialized. In step 1002, status registers are examined to determine whether sensor device 32's reset occurred due to normal power up. If the reset did occur because of normal power up, then, in step 1004, initial values for persistent variables are set. Persistent variables include the number of pours made since the attachment of this sensor device 32 to a particular bottle, the transmission queue, FCC interval timer, and initial calibrated time-base value.

In step 1006, sensor device 32 transmits a signal to personal computer 20 that it is functioning.

If, in step 1002, the reset did not occur because of a normal power up, then, in step 1008, it is determined whether the reset occurred as part of a normal calibration routine. If the reset did occur as part of a normal calibration routine, then, in step 1010, the calibration is completed, all timers are updated with the amount of time the calibration took, and any pending data transmissions are performed.

If, in step 1008, the reset did not occur as part of a normal calibration routine, then, in step 1012, microcontroller 60 reinitializes port registers and any internal peripherals. In step 1014, initial values for persistent variables are reset. In step 1016, sensor device 32 transmits a signal to personal computer 20 that an error has occurred and that all values have been reset.

In step 1018, it is determined whether it is time to calibrate microcontoller 60's internal time base. If it is time to calibrate, then, in step 1020, calibration is begun. If, in step 1018, it is not time to calibrate, then, in step 1022, a determination is made as to whether sensor device 32 is attached to bottle-34. This determination is based upon the status of sensor device 32. The status is active if magnetic sensing switch 66 is closed, and, in that case, it is assumed that sensor device 32 is attached to bottle 34.

If, in step 1022, sensor device 32 is determined to be inactive, or not attached to bottle 34, then, in step 1024, sensor device 32 transmits a signal to personal computer 20 indicating that sensor device 32 is not attached.

In step 1026, microcontroller 60 enters a low power or sleep period. After the conclusion of the sleep period, timers are updated and any pending transmissions are sent.

If, in step 1022, sensor device 32 is attached to bottle 34, then, in step 1028, a determination is made of whether a tilt is occurring. If a tilt is occurring, then in step 1030, microcontroller 60 measures the duration of the tilt, updates all timers, and sends any pending transmissions to personal computer 20. In step 1032, a determination is made of whether a valid pour has occurred. This includes distinguishing between a pour and motion of bottle 34, such as bottle jiggling, that was not a pour. The measurement of the duration of a tilt is not begun unless tilt switch 68 has remained closed for a certain minimum period of time. In addition, the measurement of the duration of a tilt is not stopped unless tilt switch 68 has remained open for a certain minimum period of time. After the timing of a pour has stopped, the duration of the pour is examined to determine whether it falls within certain limits. If the duration is within the limits, a valid pour has occurred. If not, no valid pour has occurred. For example, if the duration of the pour exceeds the maximum time limit, then the pour is treated as tip-over event, and is not a valid pour. If a valid pour has occurred, then, in step 1034, the pour data is added to the transmit queue to await transmission to personal computer 20.

If, in step 1028, no tilt occurred, or if, in step 1032, a valid pour did not occur, or after step 1034, in step 1036, a determination is made as to whether there are any pending transmissions. If no pending transmissions exist, then, in step 1038, microcontroller 60 enters a low power mode. After the conclusions of the sleep period, timers are updated and any pending transmissions are sent, if the transmit interval has elapsed.

If, in step 1036, there are pending transmissions, then, in step 1040, it is determined whether the transmit interval has elapsed. The transmit interval is determined by FCC regulations. If the transmit interval has elapsed, then, in step 1042, pending transmissions are sent and timers are updated. Microcontroller 60 then repeats step 1018.

If, in step 1040, the transmit interval has not elapsed, then, in step 1044, microcontroller 60 waits a brief period of time and, in step 1046, updates all timers. Microcontroller 60 then repeats step 1018.

In order to identify the particular serving person pouring a container having a particular sensor device 32 attached, sensor device 32 may contain one or more external push buttons. When depressed, the push button signals microcontroller 60. Microcontroller 60 then transmits a signal to personal computer 20. Personal computer 20 can be programmed to correlate the signal from microcontroller 60 with the identity of a particular serving person, provided each serving person has been assigned a particular push button. Thus, if a serving person depresses the push button before a drink is dispensed, then the identity of the serving person who performed the dispensing event will be associated with that dispensing event.

To be used, sensor device 32 is removably attached to the exterior of bottle 34. Sensor device 32 is preferably attached to bottle underside 80, but may be attached to other areas of bottle 34, such as the side. Sensor device 32 may be satisfactorily attached in a number of different ways, including as described below.

FIGS. 2, 3A, 3B, 6, 7, and 8 show sensor device 32 attached to bottle underside 80 using sensor device holder 82. Holder 82 is circular, slightly larger in diameter than sensor device 32, and about the same thickness as sensor device 32. Holder 82 includes magnet 84, magnet cavity 83, top portion 86, side portion 88, and flap portions 90. Top portion 86 is a thin, planar portion having upper surface 92 and lower surface 94. Side portion 88 is a circular wall having a diameter slightly larger than the diameter of housing 36. Flap portions 90 are generally rectangular in shape and are cut out of top portion 86 on three sides 91 such that they are nonremovably, but flexibly, attached to top portion 86 at edge 96. Four flap portions 90 have been found to work well, although a greater or lesser number may also work. Magnet 84 is attached to top portion 86 on lower surface 94, and fits inside magnet cavity 83. Holder 82 is preferably made of a molded plastic material and is intended to be discarded with bottle 34 when bottle 34 is empty.

Figure 9:
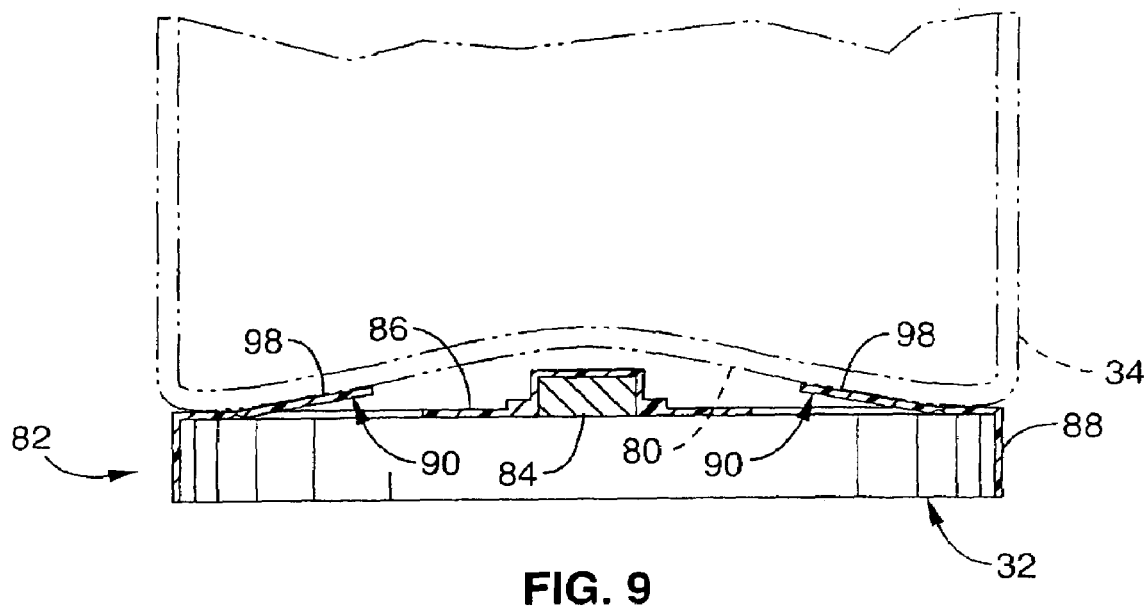
FIG. 9 is a cross-section of the first embodiment of the sensor device and holder.
Figure 10:
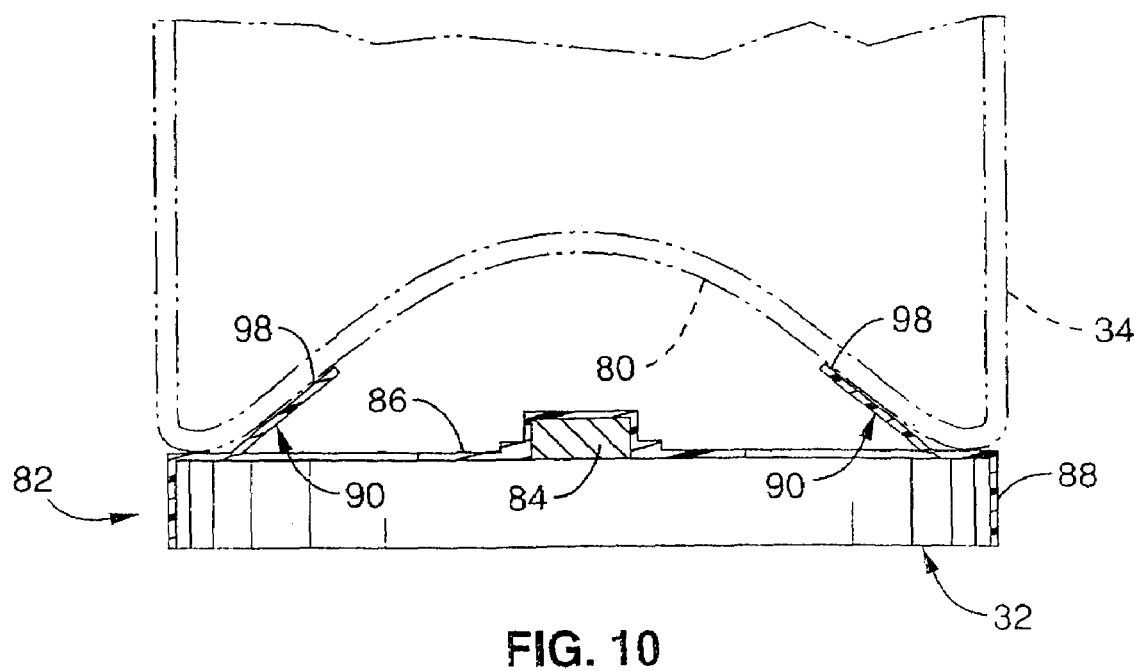
FIG. 10 is a cross-section of the first embodiment of the sensor device and holder.

Holder 32 is preferably attached to bottle underside 80 using an adhesive. Epoxy glue works well because it results in fusing of the glass of bottle 34 with holder 82. Epoxy glue is placed on upper surface 98 of flap portions 90, and holder 82 is pressed against bottle underside 80. Flap portions 90 are flexible such that they rest against bottle underside 80 at the angle necessary to contact bottle underside 80, regardless of the amount of concavity of bottle underside 80. As shown in FIG. 9, in bottle 34 having bottle underside 80 with a minimum amount of concavity, in order to contact bottle underside 80, flap portions 90 may lie in a plane that is almost horizontal. As shown in FIG. 10, bottle 34 having bottle underside 80 with a larger amount of concavity, flap portions 90 are almost vertical. This allows holder 82 to fit snugly to bottle underside 80 of a variety of different shaped bottles.

Sensor device 32 fits tightly into holder 82 such that when holder 82 is affixed to bottle underside 80, sensor device 32 is securely, but removably, attached to bottle 34. Thus, sensor device 32 is relatively unobtrusive.

When sensor device 32 is properly placed into holder 82, sensor device 32's lid portion 40 comes into proximity with holder 82's top portion 86 such that sensor device 32's magnetic sensing switch 66 comes into proximity with holder 82's magnet 84, causing magnetic sensing switch 66 to close. This is most easily achieved if magnetic sensing switch 66 and magnet 84 are both located centrally upon sensor device 32 and holder 82, respectively. This triggers microcontroller 60 to send data to radio transmitter 62. The data includes microcontroller 60's unique identifier and the status of sensor device 32. The status of sensor device 32 is either active or inactive. The status is active if magnetic sensing switch 66 is closed. The status is inactive if magnetic sensing switch 66 is open. Radio transmitter 62 uses radio antenna 64 to send data in a radio frequency to data receiver 18. Radio transmitters 62, which transmit over a radio frequency of 418 megahertz, have been found to work well, and such transmitters are relatively inexpensive.

Several other ways of attaching sensor device 32 to bottle 34 may also work well. They include adhesives, suction devices, clips, elastics, straps, strings, screws, bayonet mounts, and methods using pressure, drilling, twisting, magnetism, or heat, or combinations of any of these.

When sensor device 32 is removed from holder 82, sensor device 32's lid portion 40 loses contact with holder 82's top portion 86 such that magnetic sensing switch 66 is no longer in proximity with magnet 84, causing magnetic sensing switch 66 to open. This triggers microcontroller 60 to send data to data receiver 18 indicating that sensor device 32 is inactive.

Second Embodiment of Sensor Device

Figure 11:
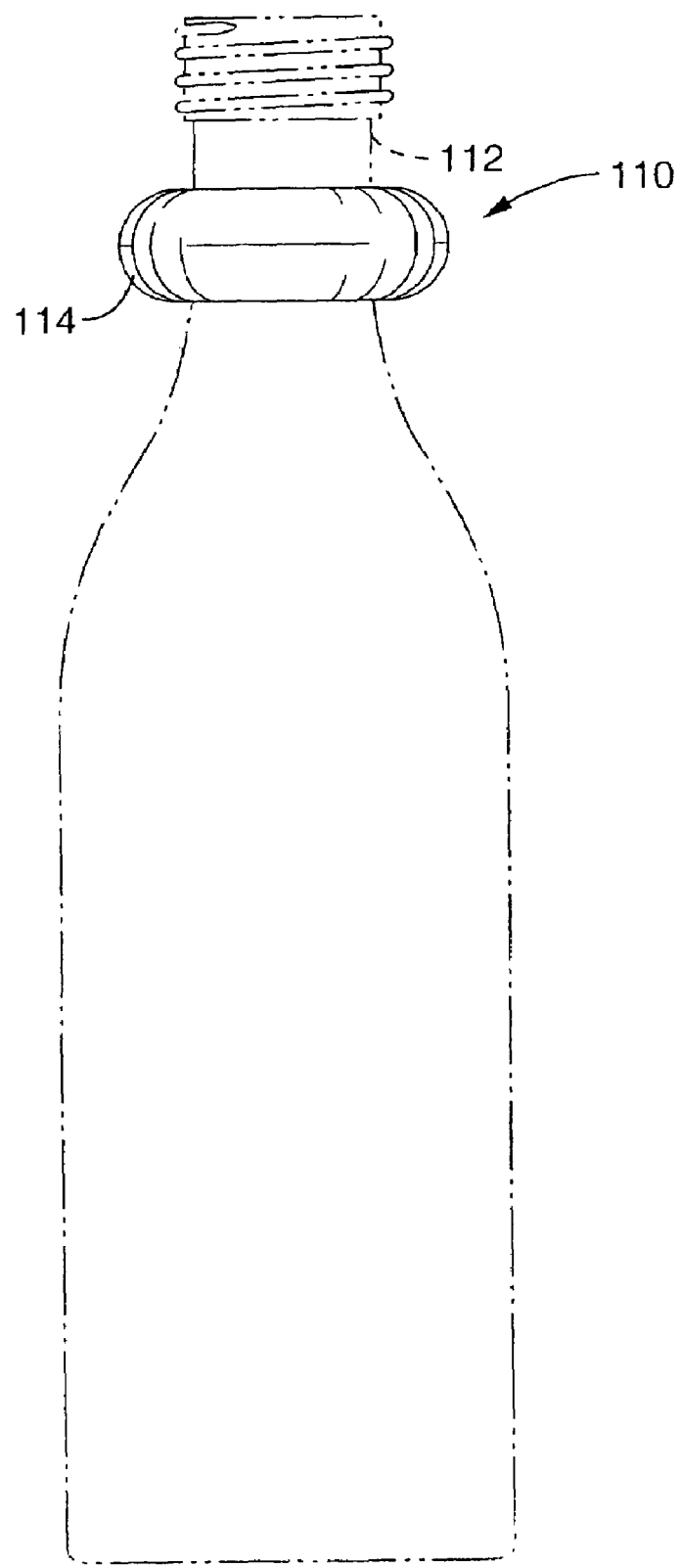
FIG. 11 is a side view of the second embodiment of the sensor device.

FIG. 11 shows second embodiment 110 of sensor device 12 as used with bottle 34. Sensor device 110 is doughnut-shaped, having a central aperture with a diameter slightly larger than the neck of bottle 34. The central aperture is sized so that sensor device 110 can fit snugly around neck 112 of many different sizes of bottle 34.

Sensor device 110 includes housing 114, printed circuit board, and electronic components. Housing 114 is preferably constructed of the same type of material as housing 36 of sensor device 32, although housing 114 may also include a flexible portion that would contact bottle neck 112. A printed circuit board and various electronic components are the same as the printed circuit board and electronic components, respectively, of sensor device 32, but the circuit board may be shaped differently and the components may be arranged differently so as to fit into housing 114. In lieu of a magnetic sensing switch, a mechanical switch can be used.

To be used, sensor device 110 is removably attached to the exterior of bottle 34 by sliding it over bottle 34's neck 112 until it fits snugly. If sensor device 110 includes a magnetic sensing switch, then a small magnet must be glued onto bottle 34 so that the magnet will come into proximity with the magnetic sensing switch when sensor device 110 is placed onto bottle neck 112, closing the magnetic sensing switch. Sensor device 110 then transmits data in the same fashion as sensor device 32.

If sensor device 110 contains a mechanical switch instead of a magnetic sensing switch, then there is no need for a magnet. In that case, the placing of sensor device 110 onto bottle neck 112 causes the mechanical switch to be compressed, closing the mechanical switch. Sensor device 110 then transmits data in the same fashion as sensor device 32.

Third Embodiment of Sensor Device

Figure 12:
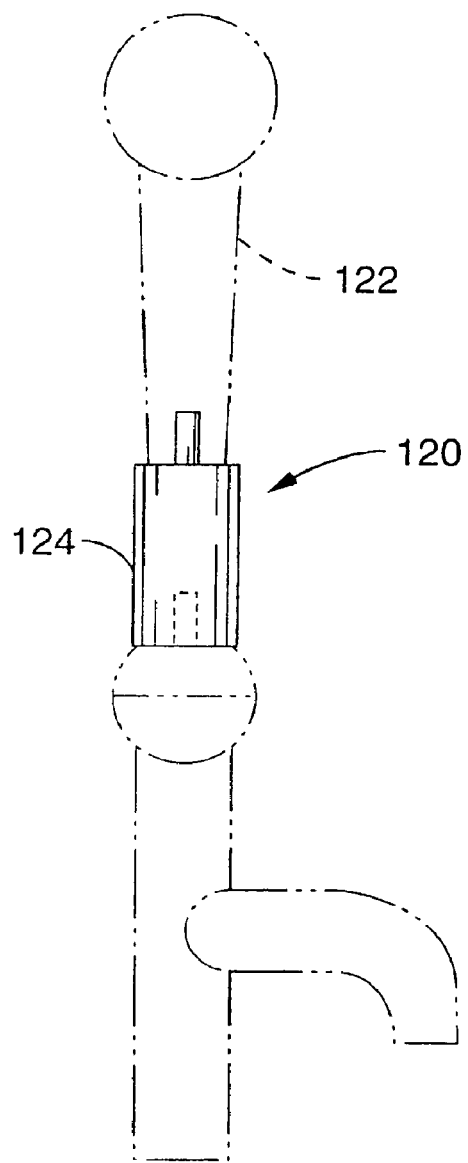
FIG. 12 is a side view of the third embodiment of the sensor device.
Figure 13:
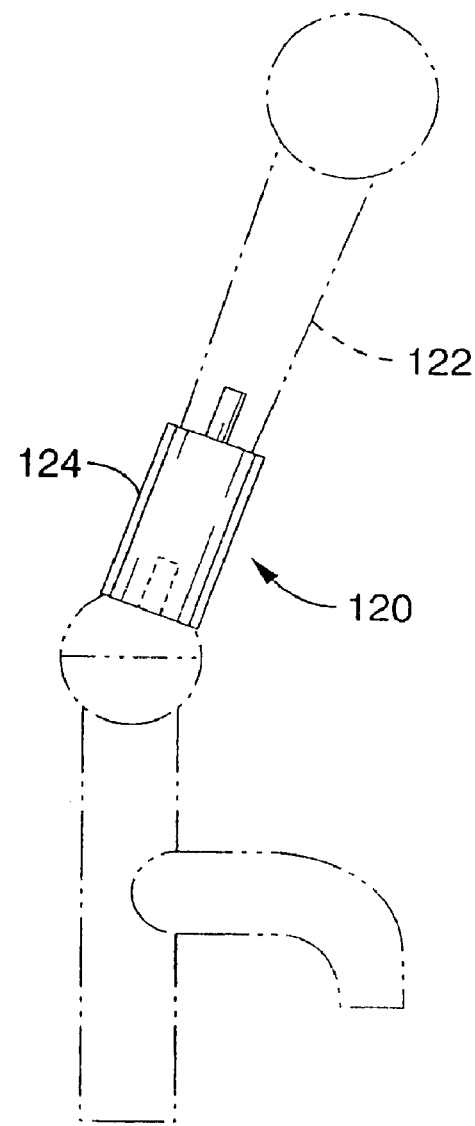
FIG. 13 is a side view of the third embodiment of the sensor device.

FIGS. 12 and 13 show a third embodiment 120 of sensor device 12, which is used to detect dispensing of beverages from a container having tap handle 122, such as beer. Sensor device 120 includes housing 124, which is preferably a hard plastic cylinder about 2 inches long and 1 inch in diameter. Housing 124 contains a printed circuit board and electric components similar to those of sensor device 32, except that a motion sensor, such as a single chip accelerometer, or an IMEMS, is preferable to a mercury tilt switch, and a mechanical switch is preferable to a magnetic sensing switch.

To be used, sensor device 120 is removably attached to a moving part, such as tap handle 122, by a screw-type mechanism. For example, housing 124 may have a nut on one end and a bolt on the other end, allowing sensor device 120 to be screwed into tap handle 122. The attachment of sensor device 120 in this fashion causes sensor device 120's mechanical switch to be compressed, resulting in the activation of sensor device 120 and the transmission of data to personal computer 120.

The above-described three embodiments of sensor device 12 have been found to be satisfactory. Other embodiments, of different-sizes or shapes, however, may also work. For example, a wine bottle corkscrew may include sensor device 12 such that a signal is sent when the corkscrew is pressed against the handle, such as when a cork is removed from a wine bottle. As another example, sensor device 12 may be installed on a door to a storage room, refrigerator, or other space. The detection of the opening of the door transmits a signal indicating that the door has been opened. In another example, sensor device 12 may be used on a horizontal lever of a container such as the Taylor frozen drink machine.

Bottle Opener/Camera System

Figure 14:
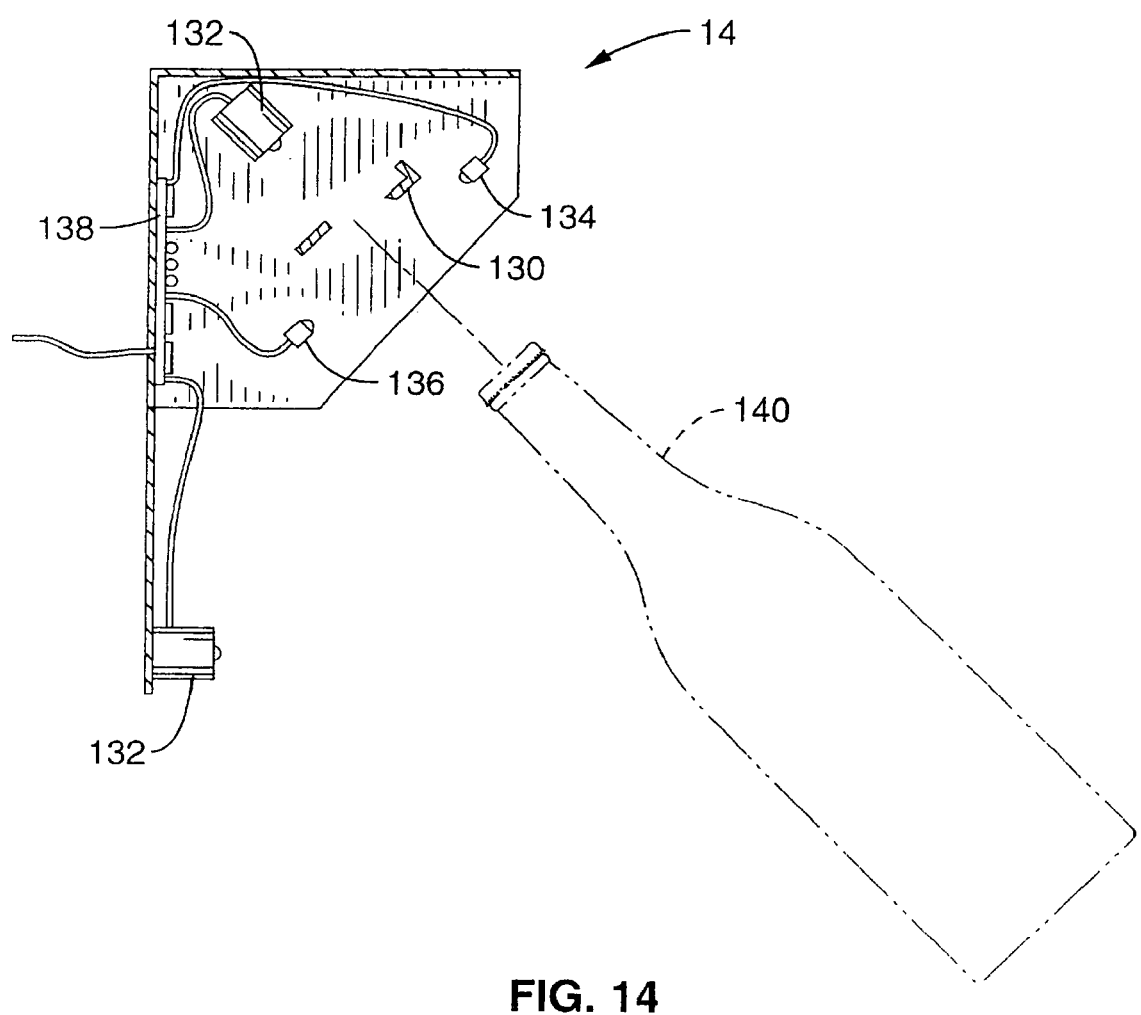
FIG. 14 is a cut-away view of the bottle opener/camera system.
Figure 15:
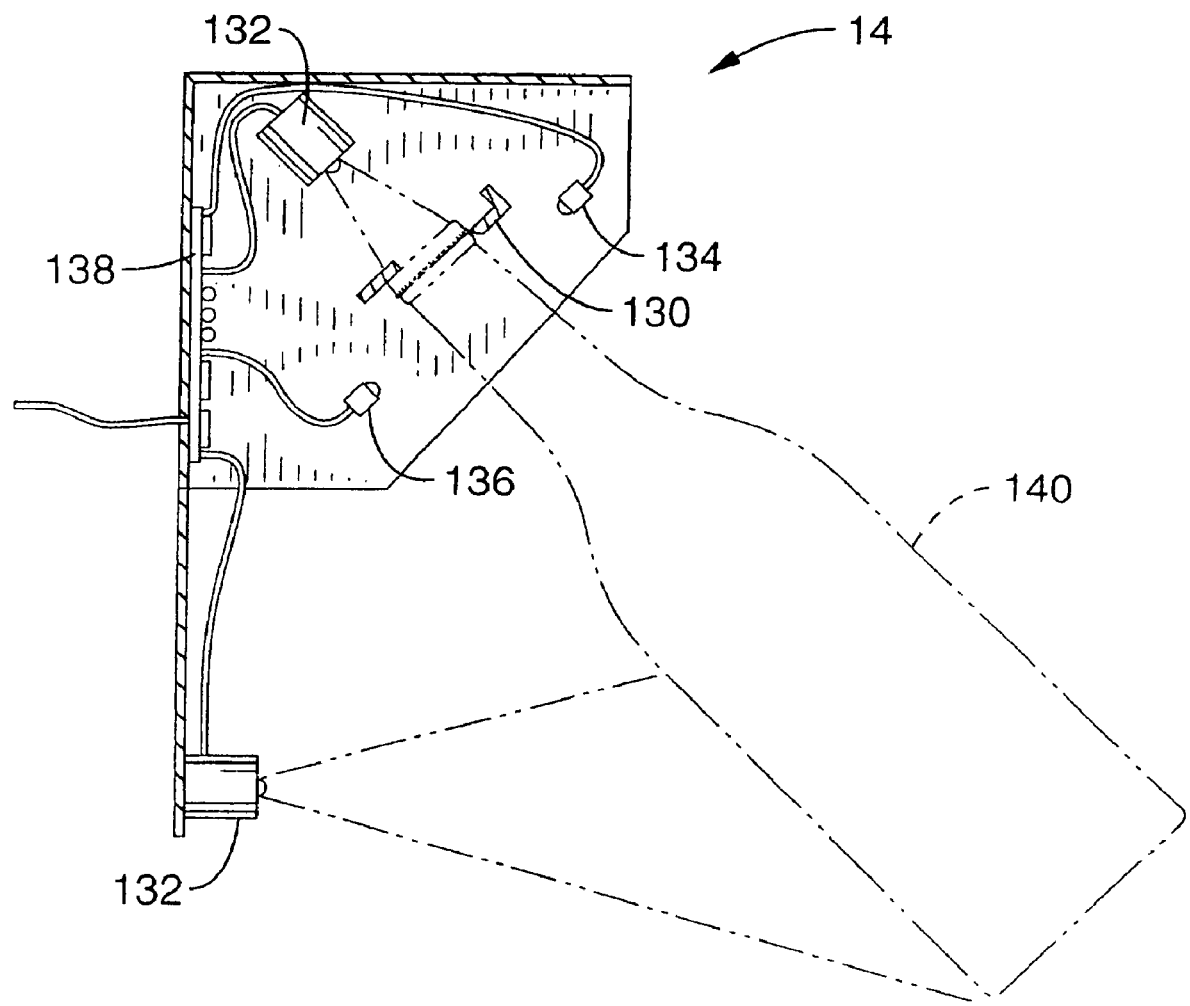
FIG. 15 is a cut-away view of the bottle opener/camera system in use.

FIGS. 14 and 15 show bottle opener/camera system 14, which includes bottle cap opener 130, video camera 132, infrared light emitting diode 134, infrared receiver 136, and microcontroller 138. These components are located inside a box-like structure that can be attached to a wall, cabinet, counter ledge, or other surface where single-serving bottles 140 are served. Video camera 132 is positioned such that it is directed toward the top of bottle 140 when bottle 140 is inserted into opener 130. A second video camera 132 may be placed such that it is directed toward the label of bottle 140. Bottle opener/camera system 14 communicates directly with personal computer 120 or may use data receiver 18.

Bar Code Scanner

Bar code scanner 16 is a standard bar code scanner.

Data Receiver

System 10 includes at least one data receiver 18. Data receiver 18 is a wireless data receiver, preferably a radio frequency receiver. Data receiver 18 receives radio frequency signals from radio transmitter 62 in sensor device 12. Data receivers 18 are preferably located in areas where drinks are being dispensed and in areas where sensor devices 12 are used (e.g., doors to storage areas).

Data receiver 18 could be an infrared receiver if sensor device 12 contains an infrared transmitter in lieu of a radio transmitter.

Personal Computer

System 10 includes at least one personal computer 20. Personal computer 20 preferably includes a CPU, monitor, keyboard, and Windows operating system.

Personal computer 20 contains databases which include the following information: beverage information, drink recipes, PLU numbers, general inventory information for the beverages to be dispensed (e.g., bottle values, volumes, and count), bar code information, pour rates, identities and status of sensor devices 32, assignments of sensor devices 32, POS matching data, bottle cap images, locations of bar cameras 24, and locations of data receivers 18.

Personal computer 20 is programmed with applications software that performs tasks including collecting and processing data from sensor devices 32, bar cameras 24, bottle opener/camera system 14, point of sale system 22, and bar code scanner 16, sending data to paging system 30, generating reports.

Web Server and Network

Web server 28 includes a host computer, Web server software, and a Web application. The application includes a database and software which can collect and aggregate data from two or more personal computers 20.

Network 26 is the Internet, but may also include a local area network.

Electronic Paging System

Electronic paging system 30 is preferably a standard pager activated through a modem interface. In lieu of paging system 30, an e-mail system, telephone, or other means of communicating can be used.

Point of Sale System

Point of sale (POS) system 22 is a standard point of sale system, such as that made by Squirrel Systems in San Francisco, Calif. Point of sale system 22 is interfaced to personal computer 20 through POS interface 23. Serving persons use POS system 22 to "ring-up" drinks, also called performing register ring-ups. The ring-up may indicate that a particular drink was charged to a customer and the amount of the charge, as well as that a drink is complimentary and that there was no charge.

Bar Camera

System 10 includes at least one bar camera 24. Bar camera 24 is preferably an "on board" camera such as that sold by Clover USA. Bar cameras 24 may be located at various places throughout the bar; such as the entrances to wine cellars, storage rooms, walk-in coolers, and refrigerators. Bar cameras 24 are connected to personal computer 20.

Set Up Service Transaction Monitoring System

Sensor devices 32 must be inventoried by entering their unique identifiers into a database in personal computer 20. This may be accomplished in a number of ways. The information may be manually input into personal computer 20, or, if sensor devices 32 are labeled with Universal Product Code information, bar code scanner 16 may be used. Alternatively, the information may be sent to personal computer 20 automatically by activating each sensor device 32 by placing sensor device 32 into holder 82. As described above, this causes data to be transmitted to data receiver 18, and then to personal computer 20, where it is added to the database. Sensor device 32 is then deactivated by removing it from holder 82. Sensor device 32 may then be stored for later use on a container.

If system 10 is being used to monitor dispensing events of more than one bar or restaurant, this process may include the manual entry into personal computer 20 of information indicating in which bar or restaurant each sensor device 32 is to be used. This information is added to the database.

Attachment and Assignment of Sensor Devices

Sensor devices 32 must be attached to each multiple-serving container for which dispensing events will be monitored and must be assigned to that container. Methods of attaching sensor device 12 to containers are described above. The attachment of sensor device 12 to a container activates sensor device 12, causing sensor device 12 to automatically transmit data, including sensor device 12's unique identifier and its status, to personal computer 20, as described above. Each sensor device 12's status is either active or inactive. If sensor device 12 is active, it is assumed to be attached to bottle 34, and is referred to as "on bottle." If sensor device 12 is inactive, it is assumed to be detached from bottle 34, and is referred to as "off bottle." In this case, sensor device 12's status is on bottle. This information is added to the database.

The assignment of sensor devices 12 to containers also includes the entry into personal computer 20's database of information about the container and the beverage it contains, including the type of beverage, size of the container, manufacturer, brand, cost, supplier, and the amount of beverage remaining in the container if the container has been opened. The information about the container and its contents may be entered into personal computer 20 manually or by the use of bar code scanner 16 if the information is contained in the Universal Product Code on the container's label.

Sensor devices 12 must also be attached to tap handles and the handles of bulk storage containers for which dispensing events will be monitored. After being attached, each sensor device 12 transmits data to personal computer 20 in the same fashion as set forth above.

Personal computer 20 can be programmed to either "permanently" or "temporarily" assign each sensor device 12 to a particular type of beverage and container (e.g., Absolut vodka, 750 ml.). To permanently assign sensor device 12 to a particular type of beverage and container, personal computer 20 is programmed to retain the assignment information indefinitely, even after sensor device 12 is removed from a container.

To temporarily assign sensor device 12 to a particular type of beverage and container, personal computer 20 is programmed to discard the assignment information when sensor device 12 is removed from a container. In that case, sensor device 12 must be reassigned each time it is attached to a new container. An advantage of this technique is that sensor devices 12 can be used in a more flexible fashion, being capable of placement on different types of containers or different brands of beverage.

Sensor devices 12 may also be attached to doors to storage rooms, walk-in coolers, wine cellars, and other locations where controlling inventory of items is important.

Thus, after completion of attachment and assignment, the database includes the unique identifier and status of each sensor device 12, and the type of container and its contents, to which each sensor device 12 is attached and assigned.

Once sensor device 12 is attached and assigned to a particular container, at regular intervals, sensor device 12 "checks in" with personal computer 20. This is accomplished by sensor device 12's transmitting data, including its unique identifier and its status, to personal computer 20. The checking in may occur at any periodic interval. Intervals of about four hours have been found to work well.

Alternatively, sensor device 12 can be constructed to include a transceiver. In this case, personal computer 20 can poll all sensor devices 12 to determine their status. Sensor devices 12 will respond with their unique identifiers and status.

In order to conserve its battery 70, sensor device 32 enters a low-power mode, or sleeps, whenever possible, using power conservation methods, known in the art, appropriate for the particular hardware components.

If sensor device 32 is detached from bottle 34, magnetic sensing switch 66 will open and sensor device 32's status will change from active to inactive. This will cause sensor device device 32's unique identifier and its status of inactive of "off bottle."

Inventorying of Bottle Opener/Camera System

Bottle opener/camera system 14 must be inventoried by entering-identifying and other information into personal computer 20's database. This process can be accomplished by using bar code scanner 16 if bottle opener/camera system is labeled with Universal Product Code information.

Identification of Serving Personnel

Each serving person should check in at the beginning of their shift. This includes entering their name and the corresponding identifying device, such as a push button, which has been assigned to them.

Operation of Service Transaction Monitoring System

Overall System Operation

Figure 16A:
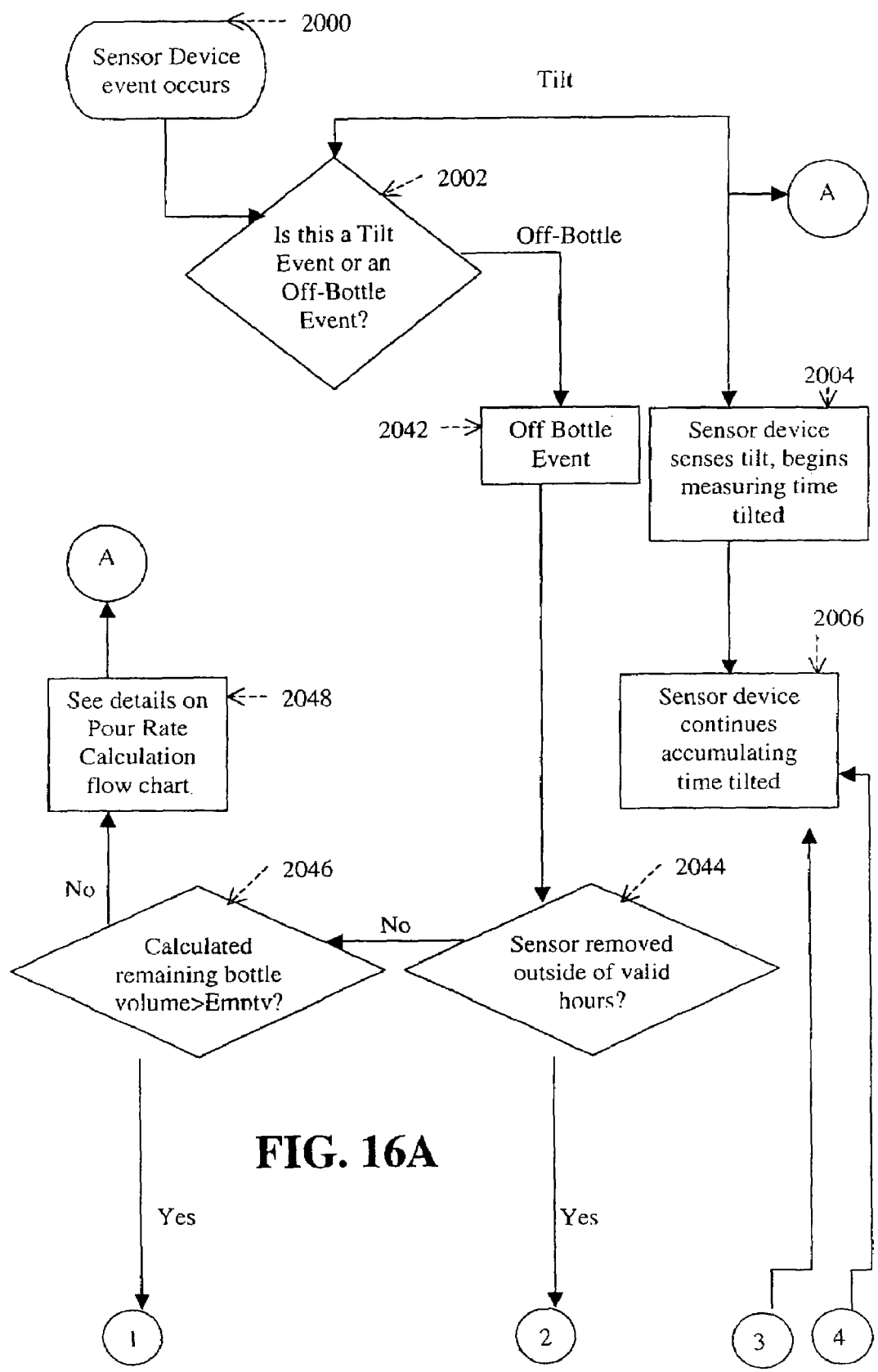
FIG. 16 is a flow chart showing the operation of the system.
Figure 16B:
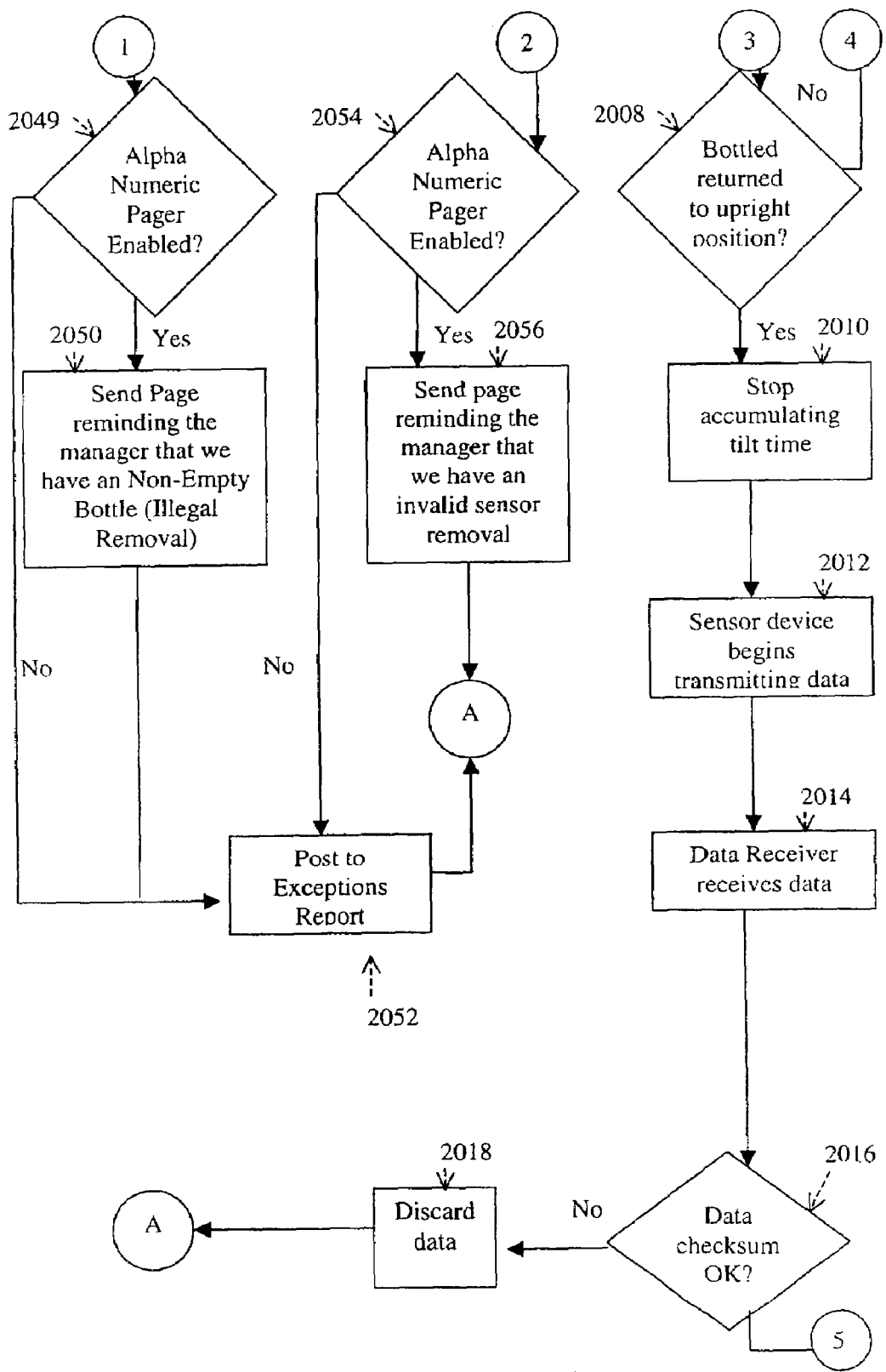
Figure 16C:
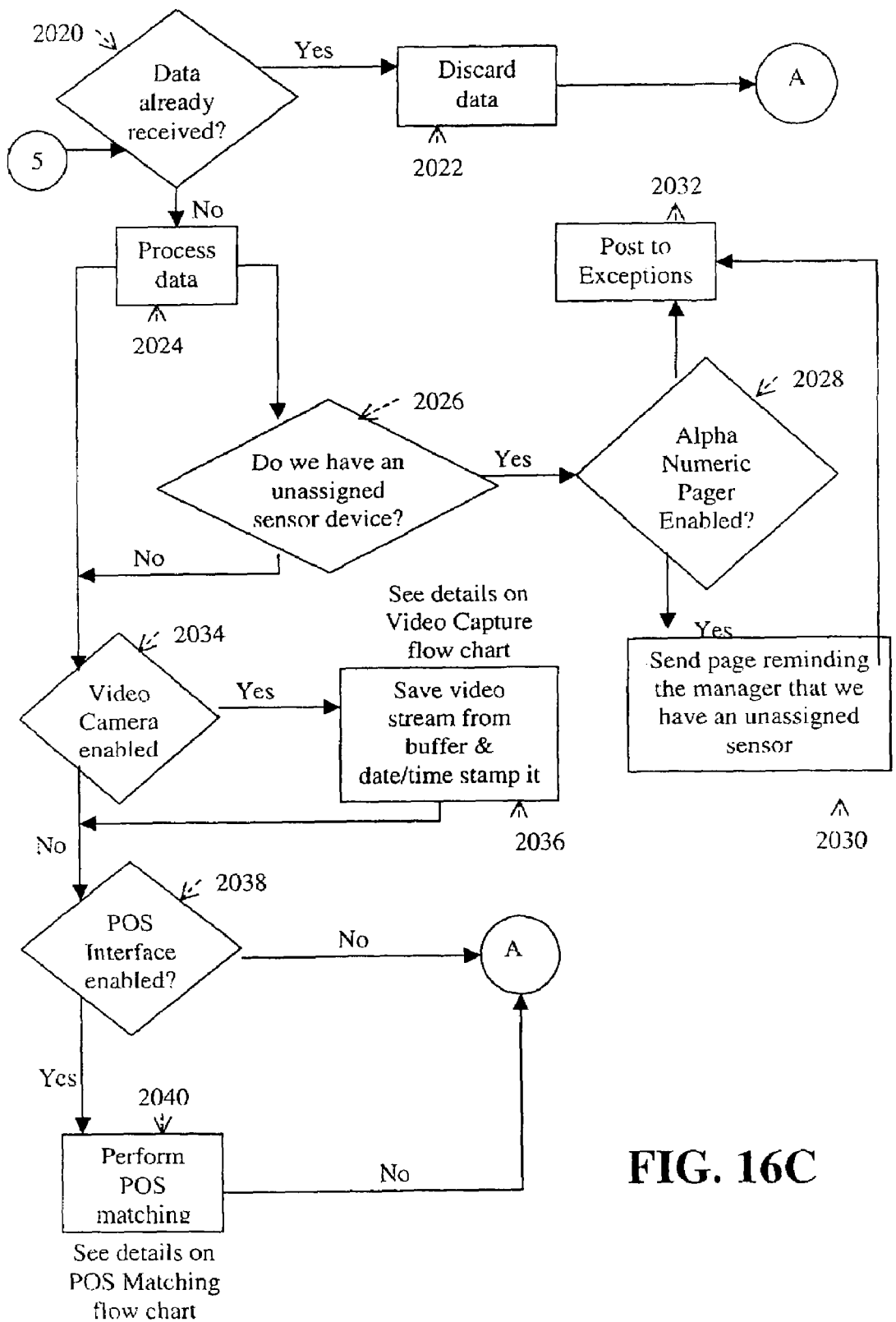

FIG. 16 is a flow chart of the preferred steps for detecting dispensing events from multiple-serving containers. In step 2000, a sensor device 32 event occurs. In step 2002, it is determined whether the event is a tilt or an off-bottle event. A tile event occurs when bottle 34 is tilted from its original upright position, as the beverage it contains is begun to be poured. An off-bottle event occurs when sensor device 32 is removed from holder 82 on bottle 34.

If, in step 2002, a tilt event has occurred, then, in step 2004, sensor device 32 senses the tilt and begins measuring the duration of the tilt. This occurs when bottle 34 is tilted from vertical to approximately horizontal, by the closing of tilt switch 68. The closing of tilt switch 68 triggers microcontroller 60 to start measuring the time bottle 34 is tilted. In step 2006, as the beverage is being poured, sensor device 32 continues to measure the time bottle 34 is tilted. In step 2008, if bottle 34 is not returned to the upright position, then sensor device 32 repeats step 2006 and continues to measure time. If, in step 2008, bottle 34 is returned to the upright position, then in step 2010, sensor device 32 stops measuring the time of the tilt. This is accomplished by the opening of tilt switch 68, which triggers microcontroller 60 to stop measuring the tilt time. In step 2012, sensor device 32 begins to transmit data. Microcontroller 60 transmits data to radio transmitter 62. The data includes the unique identifier of the particular sensor device 32 in use, the status of sensor device 32, which is, in this case, active or "on bottle," the duration of the tilt, the time since the tilt occurred, and the number of times the particular bottle 34 has been tilted since its sensor device 32 was attached. Sensor device 32 also transmits the same type of data from the last four times that this particular bottle 34 was tilted. Radio transmitter 62 transmits the data via radio frequency to data receiver 18. Because FCC regulations limit the transmission of data over the preferred frequency of 418 megahertz to no more than once every ten seconds, sensor device 32 does not transmit data until ten or more seconds have passed since its last transmission. As a failsafe mechanism, sensor device 32 preferably repeats the transmission of the same data multiple times, to ensure that the data is received by data receiver 18, even in the presence of competing or extraneous signals. The number of times the data is transmitted is set in advance; a total of three times has been found to be sufficient. Each transmission is separated by a discrete, set time interval, such as ten seconds, and is numbered with a unique identifier.

In step 2014, data receiver 18 receives data from sensor device 32. Data receiver 18 sends the data to personal computer 20. In step 2016, the data checksum is verified. If, in step 2016, the data checksum is valid, then, in step 2020, a determination of whether this particular data was already received is made. If, in step 202, this data was already received, then, in step 2022, the data is discarded. If, instep 2020, the data was not already received, then in step 2024, the data is processed. Processing includes writing the data to the database and decrementing the inventory.

In step 2026, it is determined whether sensor device 32 is unassigned, i.e., whether it was not assigned to a particular bottle 34. If sensor device 32 is unassigned, then, in step 2028, paging system 30 is enabled, then, in step 2030, a page is sent. Preferably, the page is sent to a manager or other supervisory person which indicates that sensor device 32 is unassigned. In step 2032, the information is added to the database, where it is posted to an exceptions report. If, in step 2028, paging system 30 is not enabled, then, in step 2032, the information is posted to the exceptions report.

If in step 2026, sensor device 32 was not unassigned, then, in step 2034, a determination is made as to whether bar camera 24 is enabled. If, in step 2034, bar camera 24 is enabled, then, in step 2036, the video stream pertaining to the particular dispensing event is saved. The sub-steps of saving the relevant video steam, step 2036, are detailed in FIG. 17, described below.

If, in step 2034, bar camera 24 is not enabled, or, after the completion of video saving of step 2036, then, in step 2038, a determination is made as to whether point of sale interface 23 is enabled. If POS interface 23 is not enabled, then no POS matching occurs. If, in step 2038, POS interface 23 is enabled, then, in step 2040, POS matching is performed. The sub-steps of POS matching, step 2040, are shown in FIG. 18, described below.

If, in step 2002, an off-bottle event has occurred, then, in step 2044, it is determined whether sensor device 32 was removed outside of valid hours. Valid hours are the hours during which bar management permits sensor devices 32 to be removed from bottles 34, and are set in advance. For example, sensor devices 32 may only be permitted to be removed from 8 a.m. to 10 a.m. each day.

Figure 19:
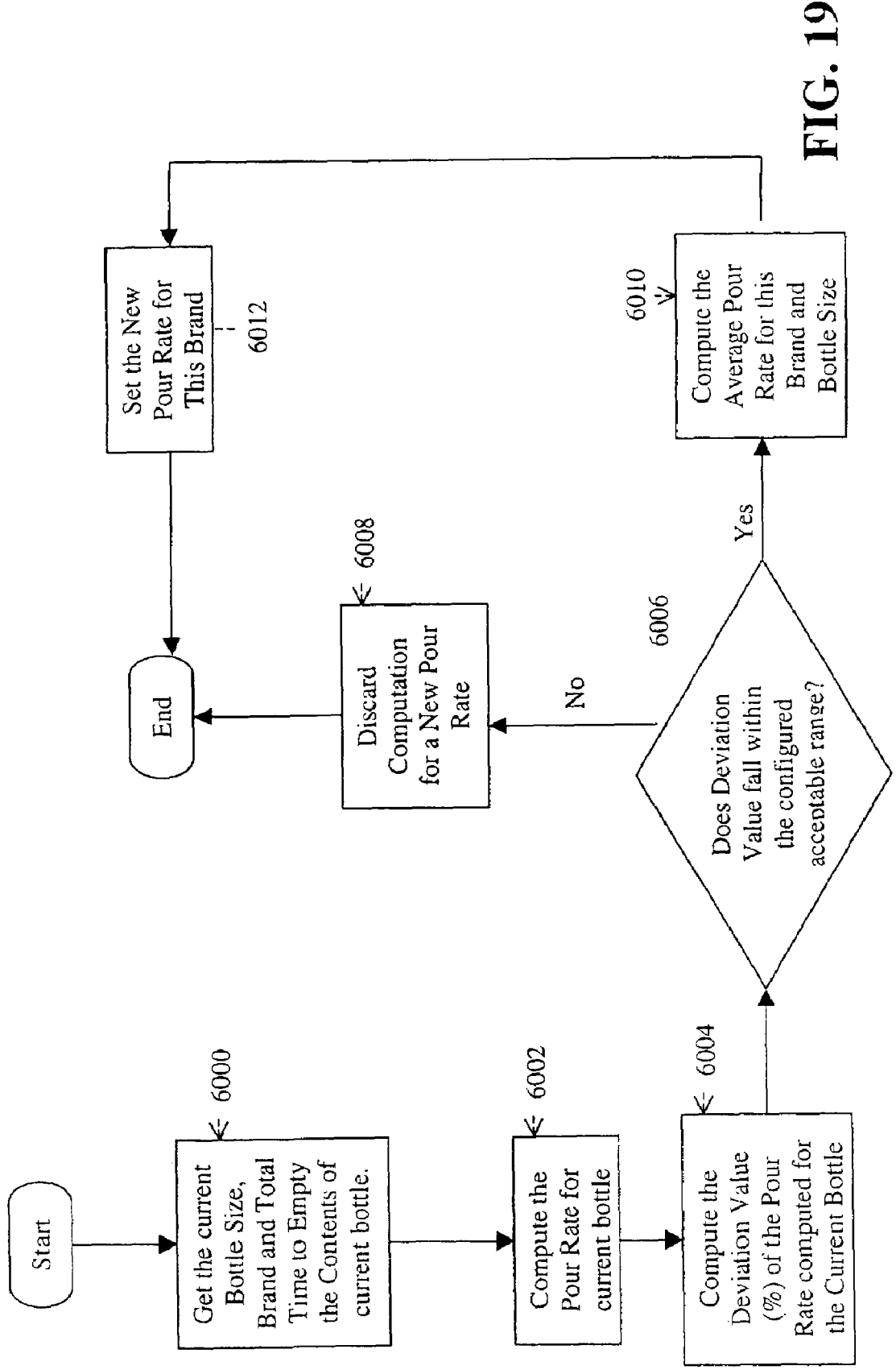
FIG. 19 is a flow chart showing the sub-steps to calculate pour rate.

If, in step 2044, sensor device 32 was not removed outside of valid hours, then, in step 2046, it is determined whether the calculated remaining bottle volume is greater than empty. The calculated remaining bottle volume is obtained from the database, which has tracked the number of dispensing events for this particular bottle and the total duration of pouring time and has calculated a pour rate. If, in step 2046, the calculated remaining bottle volume is not greater than empty, i.e., bottle volume is calculated to be empty, then, in step 2048, the pour rate is calculated. The sub-steps performed to calculate the pour rate, step 2048, are shown in FIG. 19, described below.

If, in step 2046, the calculated remaining bottle volume is greater than empty, i.e., there is still beverage contained in bottle 34, then, in step 2049, it is determined whether paging system 30 is enabled. If paging system 30 is enabled, then, in step 2050, a page is sent, preferably to management, indicating that sensor device 32 has been removed from a bottle that is not empty. In step 2052, this information is added to the database, where it is posted to an exceptions report. If, in step 2048, it is determined that paging system 30 is not enabled, then, in step 2052, the information is added to the database, where it is posted to an exceptions report.

If, in step 2044, sensor device 32 was removed outside of valid hours, then, in step 2054, a determination is made as to whether paging system 30 is enabled. If paging system 30 is enabled, then, in step 2056, a page is sent, preferably to a manager, indicating that a removal of sensor device 32 has occurred outside of valid hours. If, in step 2054, paging system 30 is not enabled, then, in step 2052, the information is added to the database, where it is posted to an exceptions report.

Video Capture

System 10 saves video only for the duration of a specific event, for instance, the tilt of a bottle or the motion of a handle. In addition, system 10 automatically identifies the event that triggered the saving of the video. System 10 also saves the video frames immediately before and after the triggering event, enhancing the context of the video of the dispensing event and providing more information for purposes of audit.

Figure 17:
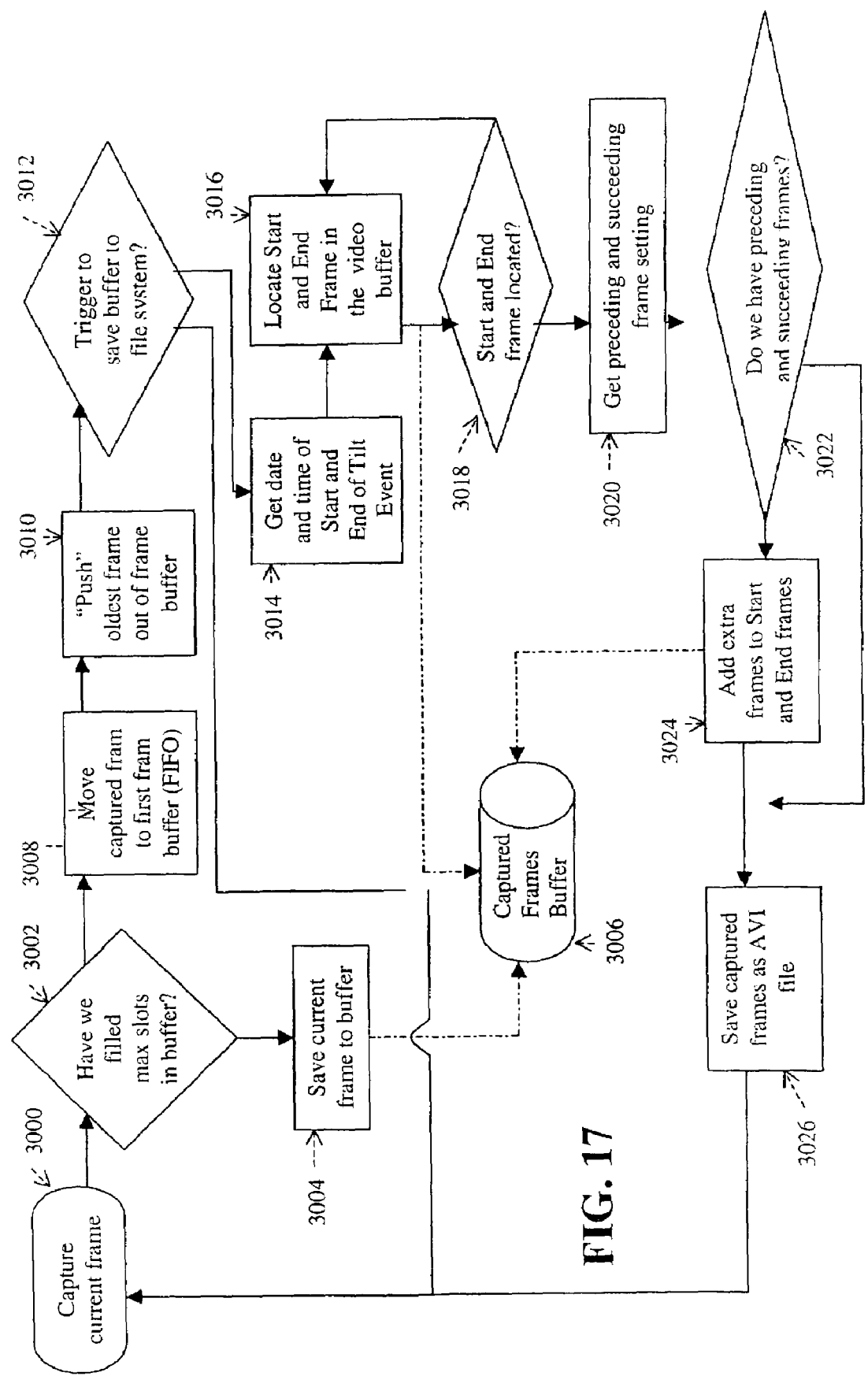
FIG. 17 is a flow chart showing the sub-steps of saving video.

FIG. 17 shows the preferred sub-steps performed to save video as occurs in step 2036 of FIG. 16. In step 3000, the current frame of the video is captured. In step 3002, a determination is made as to whether the maximum slots in the buffer have been filled. If, in step 3002, the maximum slots have not been filled, then, in step 3004, the current frame is saved to the buffer (3006). If, in step 3002, the maximum slots have been filled, then, in step 3008, the captured frame is moved to the first frame buffer. In step 3010, the oldest frame is removed from the frame buffer. In step 3012, a determination is made of whether there has been a trigger to save the buffer to a file system. Triggering events include the attaching or detaching of sensor device 32 from a bottle, or a dispensing event. FIG. 17 shows the steps that apply when the triggering event is a dispensing event.

If, in step 3012, there has been a trigger, then, in step 3014, the date and times of the start and end of the dispensing event are obtained from the database. If, in step 3012, there is not trigger, then the current frame continues to be captured, as in step 3000.

In step 3016, the frames that correspond to the start and end times of the dispensing event are sought in the video buffer. The start frame corresponds to the start time and the end frame to the end time. In step 3018, it is determined whether the start and end frames can be located. If, instep 3018, the start and end frames cannot be located, then step 3016 is repeated and the start and end frames are sought. If, in step 3018, the start and end frames are located, then, instep 3020, the preceding and succeeding frame settings are obtained. The frame settings are the number of frames before and after the dispensing event that are to be saved. These settings are set in advance according to management's preference. It is important to save enough frames to provide a video context for the dispensing event and yet not so many frames that personal computer 20 resources are negatively affected. It has been found that settings of 25 frames, i.e., 25 frames before the start of a dispensing event begins and 25 frames after a dispensing event ends, provide a satisfactory video context. A setting of 25 means that up to 25 frames before and up to 25 frames after a dispensing event will be saved.

In step 3022, a determination is made as to whether the video buffer contains preceding and succeeding frames that satisfy the requirements of the frame settings. If, in step 3022, preceding or succeeding frames that satisfy the requirements of the frame settings do exist, then, in step 3024, the preceding frames are added before the start frame and the succeeding frames are added after the end frame. In step 3026, the start and end frames, the series of frames in between, and any preceding and succeeding frames are saved as a video file. If there are not preceding or succeeding frames, then, in step 3026, the start and end frames, and the series of frames in between, are saved as a video file to the file system. It has been found that AVI files can be used for this purpose.

POS Matching

FIGS. 18A, 18B, and 18C show the preferred sub-steps required to perform POS matching as occurs in step 2040 of FIG. 16. In step 5000, a POS reconciliation timer fires. In step 5002, POS system 22 is checked for new ring-ups. In step 5004, it is determined whether there are any ring-ups. If there are no ring-ups, in step 5006, the database is checked for the existence of new dispensing events, also called pours. In step 5008, a determination is made of whether there are new pours. If there are no new pours, then Step 5000 is repeated.

If, in step 5008, there is a pour, then, in step 5010, a determination is made as to whether the pour falls within the time to match window. The time to match window is a period of time before or after the pour in which the drink should be rung up. The time window is user configurable. If the time period has not expired, then the pour falls within the time to match window and step 5000 is repeated. If, in step 5010, the pour does not fall within the time to match window, i.e., the time period in which the drink should have been rung up has expired, then, in step 5012, the pour is flagged or marked as "unrung." In step 5014, it is determined whether the work shift has ended. If the work shift has not ended, step 5000 is repeated. If the work shift has ended, then, in step 5016, all pours that were not matched are flagged, and step 5000 is repeated.

If, in step 5004, ring-ups exist, then, in step 5018, it is determined whether there is a price look-up number (PLU) in personal computer 20's database. If there is no PLU in the database, then, in step 5019, the POS ring-up data is discarded and posted to the exceptions report.

If, in step 5018, a PLU does exist in the database, then, in step 5020, the drink recipe associated with that PLU is obtained from the database. In step 5022, it is determined whether all the ingredients in the drink recipe have been matched. If all ingredients have been matched, then step 5000 is repeated. If, in step 5022, all ingredients have not been matched, then, in step 5024, it is determined whether there are any unmatched pours in the database. If, in step 5024, there are unmatched pours in the database, then processing continues with step 5032 as shown on FIG. 18B.

In step 5032, it is determined whether the current pour is of the same brand as the ring-up. If, in step 5032, the current pour is of the same brand as the ring-up, then, in step 5034, it is determined whether the current pour falls within match proximity. Match proximity exists if the time allowed for a drink to be rung up has not expired. In other words, after a pour, there is a set period of time in which the serving person must ring up the drink in POS system 22. If no ring-up is entered within the set period of time, then a page is sent to serving persons to alert them that a drink has been poured that has not been rung up. If the time period has not expired, then the pour falls under match proximity, and, in step 5036, it is determined whether the pour was a pour of wine or a pour of liquor. This information is contained in the database.

If, in step 5036, a wine pour has occurred, then, in step 5038, it is determined whether the volume poured calls for a top-off matching. If the volume of wine poured is less, by a particular configurable amount, than the volume of a full glass of wine, then an additional amount, which is also configurable, of wine from a new bottle was assumed to have been poured to top off the glass. In this case, in step 5040, data from the next succeeding wine pour must be obtained. In step 5042, it is determined whether a successive or next wine pour exists. If a next wine pour exists, and, if the volume of that pour is less than a particular configurable amount, then, in step 5044, it is determined whether the time between the current wine pour and the next wine pour falls within the wine top-off pour match proximity. This is a pre-set time period within which a glass of wine may be topped off with wine from a new bottle. If, in step 5044, the time between the current wine pour and the next wine pour is within this period, then, in step 5046, the next wine pour is flagged as a dispensing event that has already been processed and is merged with the current wine pour and together, matched to the ring-up.

If, in step 5044, the time period between the current wine pour and the next wine pour is outside the allowed wine top-off pour match proximity, then processing continues with step 5056 as shown on FIG. 18C. In step 5056, the current pour is matched to the POS ring-up. In step 5058, it is determined whether the pour that is being matched was flagged as unrung. If the pour was not flagged as unrung, then processing continues with step 5020 on FIG. 18A. If, in step 5058, this pour was flagged as unrung, then, in step

5060, the pour is marked as a match and deleted from the unrung pours screen and the exceptions report. Processing then continues with step 5020 on FIG. 18A.

If, in step 5042, no next wine pour is located, then processing continues with step 5056.

If, in step 5038, the volume of wine poured does not call for a top-off matching, meaning that a full glass of wine was poured, then processing continues with step 5056 on FIG. 18C.

If, in step 5036, the dispensing event or pour is a liquor pour, then, in step 5048, it is determined whether this is the first pour from a bottle with a newly assigned sensor device 32. If it is not the first pour, then processing continues with step 5056 on FIG. 18C.

If, in step 5048, the current pour is the first pour from a bottle with a newly assigned sensor device 32, then, in step 5050, data from the last pour of the same brand of beverage is obtained from the database. In step 5052, a determination is made as to whether the current pour and the last pour from a bottle of the same brand fall within the liquor top-off match proximity. In other words, if the time period for topping off a glass of liquor has not expired, then the current pour and the last pour fall within the liquor top-off match proximity, and, in step 5054, the current pour is flagged as already matched. Processing then continues with step 5020 on FIG. 18A. If, in step 5052, the current pour and the last pour from a bottle of the same brand do not fall within the liquor top-off match proximity, meaning that the time period for topping off a glass of liquor has expired, then processing continues with 5020 on FIG. 18A.

If, in step 5034, the current pour does not fall within match proximity, then, in step 5035, the serving person is paged. In step 5062, shown on FIG. 18C, a determination is made as to whether the current pour still falls within the time to match. If the pour falls within the time to match, then the time period has not expired, and processing continues with step 5020 on FIG. 18A.

If, in step 5062, the pour does not fall within the time to match, then the time period has expired, and, in step 5064, the pour data is added to an exceptions report. In step 5065, the pour is marked unrung. Processing continues with step 5020 on FIG. 18A.

If, in step 5032, the current pour is not of the same brand as the ring-up, then, in step 5066, shown on FIG. 18C, it is determined whether the "end of shift" matching has been triggered. Triggers for end of shift matching include an end of shift or a period of time in which POS system 22 and/or personal computer 20 has been idle for a configurable period of time. If an end of shift match trigger has not occurred, then processing continues with step 5062. If, in step 5066, an end of shift match trigger has occurred, then, in step 5068, pours of any brand of liquor having a cost within a particular configurable range of the cost of the brand called for in the drink recipe will be sought. In step 5070, it is determined whether a pour of similar cost exists. If a pour of cost within the set range is located, then processing continues with step 5056. If, in step 5070, no pour of cost within the set range is located, then, in step 5072, the pour will be flagged as processed but unmatched. Processing will then continue with step 5020 on FIG. 18A.

If, in step 5024, there are no unmatched pours in the database, then, in step 5026, it is determined whether this drink recipe calls for a small pour ingredient. A small pour ingredient is an ingredient of which a small amount is called for in a drink recipe, such as a splash of a particular beverage. The pour of such an ingredient might not be treated as a valid pour by sensor device 32 and might have been discarded. Thus, in order to account for this ingredient, if, in step 5026, a small pour ingredient is called for by the drink recipe, then, in step 5028, it is determined whether the time required before a pour is automatically created has elapsed. This time is a user configurable period of time, after which system 10 will automatically create a pour for the small ingredient. Thus, if, in step 5028, the time has elapsed, then, in step 5030, a pour for the small ingredient is automatically created. Processing then continues with step 5020. If, in step 5028, the time has not elapsed, then step 5000 is repeated.

If, in step 5026, the particular drink recipe did not call for a small pour ingredient, then step 5020 is repeated.

Pour Rate

FIG. 19 shows the preferred sub-steps for calculating the pour rate, as occurs in step 2048 of FIG. 16. Pour rate, also called flow rate, is calculated in units of volume per second, for a particular bottle of a particular size and brand which has been emptied. The pour rate is calculated based on a full bottle, not on a partial bottle or an individual drink. The brand of the beverage is relevant because different kinds of beverages have different viscosities and, hence, different pour rates. The size of the bottle also may affect the rate of pour. For example, a one liter bottle of Absolut vodka may have a different pour rate than a 750 ml. Bottle of Absolut vodka. In addition, pour rates for the same brand and bottle size may vary from bar to bar, depending on whether, and what type of, pourers are usea.

In step 6000, the size of a particular bottle, the brand, and the total time required to empty the bottle are obtained. The size and brand are obtained from the database. The total time required to empty the bottle has been recorded for this particular bottle and is contained in the database. In step 6002, the pour rate for this particular bottle is computed. The pour rate is the volume of the bottle divided by the total time required to empty the bottle.

In step 6004, the pour rate computed for the bottle just emptied is compared to the existing pour rate contained in the database for this particular brand and size of bottle, and the deviation determined. In step 6006, a determination is made of whether the deviation acceptable range, then, in step 6008, the computation of the new pour rate is discarded. If, in step 6006, the deviation is within the acceptable range, then, in step 6010, an average pour rate is computed for this particular brand and bottle size, using the new pour rate and the previously computed pour rates. Thus, the average pour rate is re-computed each time a bottle of a particular size and brand is emptied. This process results in an increasingly accurate determination of pour rate as more bottles of a particular brand and size are emptied. In step 6012, the new average pour rate is entered into the database to replace the previous average pour rate.

The steps set forth in FIGS. 16–18C apply generally to sensor devices 120 used with tap handles 122, as shown in FIGS. 12 and 13, except that a motion sensor and a mechanical switch are used instead of a tilt switch and a magnetic sensing switch, respectively. When tap handle 122 is moved, sensor device 120 detects the movement and transmits data to personal computer 20.

Bottle opener/camera system 14 detects dispensing events from single serving bottles 140 as follows. Video camera 132 continuously transmits images to personal computer 20, which are discarded by personal computer 20 unless a trigger occurs. When bottle 140 is inserted into bottle cap opener 130, the infrared beam from LED 134 to infrared receiver 136 is broken. This triggers microcontroller 138 to transmit data to personal computer 20. Personal computer 20 saves video images that correspond to the opening of bottle 140. When bottle 140 is removed from bottle cap opener 130, the infrared beam is reestablished and a signal is sent to personal computer 20. The video images can then be used to determine the type of beverage that has been served by comparison with the library of bottle cap images in the database.

Inventory Reduction

The amount of inventory shown in the database is reduced after each dispensing event, according to the amount of beverage dispensed. In addition, inventory is reduced if sensor device 12 fails to check in at its regularly scheduled time, as system 10 interprets this failure to check in as a removal from the premises of the container to which sensor device is attached. System 10 may also send a page alerting a manager to the situation.

When sensor device 12 is removed from a container, the inventory is reduced by that container, the purchase order is increased by that container, and the list of empty containers is increased by that container. This is accomplished by sensor device 12's transmission of a signal indicating an inactive or off bottle status.

Thus, the perpetual inventory cycle is automatically updated and kept current in near real time, eliminating the need for physical inventory counts.

Reports

The data obtained by system 10 can be used to generate various types of reports, including under-pours, over-pours, inventory, pouring cost ratio, empty bottles, and purchase orders.

System 10 can determine the pouring cost percentage based on the income registered on POS system 22, divided by the cost of the beverages poured. System 10 automatically records the value of all poured beverages and this value can be sorted for a particular time frame, such as a shift. System 10 automatically generates a pouring cost percentage for a particular period of time by dividing the income recorded in POS system 22 by the recorded value of the beverages poured.

System 10 also determines whether a particular bottle has been over-poured or under-poured, based upon the known volume of the bottle and the number of drinks that have been determined to have been poured from that bottle. In other words, when a particular bottle is determined to be empty, because its sensor device has been removed, system 10 compares the total volume of the drink recipes attributed that bottle to the known full bottle volume. If the total volume of recipes exceeds the full bottle volume, then the bottle was under-poured, meaning that the volume actually poured was less than the volume that should have been poured according to the recipes. If the total volume of recipes is less than the full bottle volume, then the bottle was over-poured.

Processing by Web Server

Data from personal computer 20 is transmitted to Web server 28. Web server 28 may receive data from multiple personal computers 20, which may be located at different bars or restaurants. Web server 28 may produce reports such as sales and inventory, on a site-by-site basis, and may also produce aggregated sales and inventory reports for all locations. Thus, system 10 can be used to monitor a business with a single location or one with multiple locations. It may also be used to monitor multiple independent businesses.

The foregoing detailed disclosure of the inventive system, method, and apparatus is considered as only illustrative of the preferred embodiments of, and not a limitation upon the scope of, the invention. Those skilled in the art will envision many other variations of the system, method, and apparatus disclosed herein that nevertheless fall within the scope of the following claims. Alternative uses for the inventive system, method and apparatus may later be realized. Accordingly, the scope of the invention should be determined with reference to the appended claims and not by the examples that have been given.

What is claimed is:

1. A bottle opener system comprising:
 a sensor configured to detect a first motion of at least one part of a bottle opener and produce a first detection signal;
 a transmitter coupled to the sensor and configured to transmit the first detection signal; and
 a computer system configured to retrieve the first detection signal, and to perform a POS reconciliation for one or more ring-ups of a point of sale (POS) device.

2. The bottle opener system according to claim 1, wherein said bottle opener is a corkscrew.

3. The bottle opener system according to claim 1, wherein said bottle opener is a cap remover.

4. The bottle opener system of claim 1, wherein the sensor detects a second motion of at least one part of the bottle opener and produces a second detection signal that is retrieved by the computer system.

5. The bottle opener system of claim 4, wherein the computer system is configured to perform the POS reconciliation of the second detection signal with the one or more ring-ups of the POS device.

6. The bottle opener system according to claim 4, wherein the first detection signal identifies a first pour, the second detection signal identifies a second pour and said POS reconciliation comprises determining if the first pour and the second pour are to be combined into a combined pour.

7. The bottle opener system according to claim 6, wherein said POS reconciliation determines that the first pour and the second pour are to be combined based on a predetermined amount of the combined pour and proximity in time between the first pour and the second pour.

8. The bottle opener system of claim 1, wherein the sensor is assigned to a container.

9. The bottle opener system according to claim 1, further comprising:
 a database including a plurality of drink recipes, each of the plurality drink recipes having one or more ingredients;
 wherein said POS reconciliation comprises matching the first detection signal to one of the one or more ingredients to thereby select one of the plurality of drink recipes and matching the selected drink recipe to the one or more ring-ups of the POS device.

* * * * *